United States Patent
Okude et al.

(10) Patent No.: US 7,163,462 B2
(45) Date of Patent: Jan. 16, 2007

(54) PROPELLER SHAFT ASSEMBLY

(75) Inventors: Yutaka Okude, Tochigi (JP); Hirokazu Eda, Tochigi (JP)

(73) Assignee: Showa Corporation, Saitama (JP)

( * ) Notice: Subject to any disclaimer, the term of this patent is extended or adjusted under 35 U.S.C. 154(b) by 121 days.

(21) Appl. No.: 10/669,979

(22) Filed: Sep. 24, 2003

(65) Prior Publication Data
US 2004/0152528 A1 Aug. 5, 2004

(30) Foreign Application Priority Data

| Jan. 30, 2003 | (JP) | ............................. 2003-022772 |
| Jan. 30, 2003 | (JP) | ............................. 2003-022775 |
| Jan. 30, 2003 | (JP) | ............................. 2003-022777 |
| Jan. 30, 2003 | (JP) | ............................. 2003-022779 |

(51) Int. Cl.
*F16C 3/00* (2006.01)

(52) U.S. Cl. ...................... 464/182; 464/183

(58) Field of Classification Search ............... 464/182, 464/183; 403/359.9; 280/777
See application file for complete search history.

(56) References Cited

U.S. PATENT DOCUMENTS

| 3,293,884 | A | * | 12/1966 | Grob | ......................... 464/162 |
| 4,531,619 | A | * | 7/1985 | Eckels | ........................ 280/777 |
| 5,228,720 | A | * | 7/1993 | Sato et al. | .................. 280/777 |
| 6,093,107 | A | * | 7/2000 | Merlo et al. | ................. 464/162 |
| 6,574,850 | B1 | * | 6/2003 | Sadakata | ..................... 280/777 |
| 6,666,771 | B1 | * | 12/2003 | Boutin | ....................... 464/146 |

FOREIGN PATENT DOCUMENTS

| JP | 7305715 | 11/1995 |
| JP | 11303846 | 11/1999 |

* cited by examiner

*Primary Examiner*—Aaron Dunwoody
(74) *Attorney, Agent, or Firm*—Orum & Roth LLC

(57) ABSTRACT

A propeller shaft assembly is provided that includes a shock absorbing section(s) that couples an outer shaft and an inner shaft that are mutually spline-engaged to be retractable with impact loads, wherein the shock absorbing section is constructed such that a supporting member is press-fit into an inner-diameter portion of the outer shaft, and an end face of the inner shaft is disposed in contact with the supporting member in the present invention relate to a direction of retraction with respect to the outer shaft.

4 Claims, 18 Drawing Sheets

PROPELLER SHAFT ASSEMBLY

BACKGROUND OF THE INVENTION

1. Field of the Invention

The present invention relates to a propeller shaft assembly of a vehicle.

2. Description of the Related Art

Conventional propeller shafts include those of the type that absorbs impact loads caused by, for example, a vehicle crash, as disclosed in publications such as Japanese Patent Application Laid-Open No. 11-303846 (Reference Document 1) and No. 7-305715 (Reference Document 2).

The propeller shaft described in Reference Document 1 has an outer shaft spline-engaged with inner shafts. The end of each of the inner shafts is caulked at an extended portion of the outer shaft. When excessively high impact loads caused by crushing or the like are exerted, the caulked portion is plastically deformed, and the end of the inner shaft comes off from the caulked portion. The inner shafts and the outer shafts retract, and the impact load is consequently absorbed and relaxed.

The propeller shaft described in Reference Document 2 has an outer shaft spline-engaged with inner shafts. A taper portion formed in a free end portion of each inner shaft is axially engaged with a taper portion around an inner periphery of the outer shaft. When excessively high impact loads caused by crushing or the like are exerted, the axial engagement in the taper portion is released. The inner shafts and the outer shaft retract, and the impact loads are absorbed and relaxed.

In the propeller shaft assembly described in Reference Document 1, while the inner shaft is prevented from being disengaged from the outer shaft, a snap ring for determining a projection position of the inner shaft with respect to the outer shaft is fitted into a groove provided in the end portion of the inner shaft.

As described above, the propeller shaft described in Reference Document 2 has the outer shaft spline-engaged with the inner shafts. The taper portion formed in the free end portion of the inner shaft is axially engaged with the taper portion around the inner periphery of the outer shaft. When excessive impact loads caused by crushing are exerted, the axial engagement in the taper portion is released. The inner shafts and the outer shaft retract, and the impact loads are absorbed and relaxed.

In the propeller shaft described in the Reference Document 1, a shock absorbing section is formed by caulking the end of the outer shaft. As such, processing is complex, and manufacturing costs are increased.

In addition, in the propeller shaft described in the Reference Document 1, the snap ring needs to be fitted to the end portion of the inner shaft. This results in increases in components as well as assembly steps, also leading to an increase in costs.

Further, in the propeller shaft described in Reference Document 1, the groove is provided in the end portion of the inner shaft to receive the snap ring, and the end portion of the inner shaft is caulked in the extended portion of the outer shaft. This can cause the groove to be closed or damaged with caulking loads being exerted to on the end portion of the inner shaft, consequently easing disengagement of the snap ring.

In the propeller shaft described in Reference Document 2, the axial engagement portion (taper portion) of the inner shaft with respect to the outer shaft is provided in the free end portion. Nevertheless, the axial engagement portion is integral in material with the splined portion. In this case, the influence of shakiness in the rotational direction of the spline engagement between the outer shaft and the inner shaft extends to the axial engagement portion. This consequently disables high-accuracy setting of long-term steady engagement strength of the axial engagement portion between the outer shaft and the inner shaft.

An object of the present invention is to provide a propeller shaft assembly including a shock absorbing section that is constructed simply and with high accuracy to secure stability in shock absorbing performance of the propeller shaft assembly.

In the propeller shaft assembly described in the Reference Document 1, two mutually adjacent first and second shock absorbing sections are disposed parallel to each other along the axial direction. The mutually adjacent shock absorbing sections are individually provided to two ends of the common outer shaft. The one shock absorbing section connects the one inner shaft to the outer shaft, and the other shock absorbing section connects the other inner shaft. Impact loads acting on the vehicle which are absorbed initially cause the one inner shaft to retract with respect to the outer shaft in the first shock absorbing section. The loads then cause the one inner shaft to slide into a hollow portion of the outer shaft by a first shock absorption stroke. In this manner, the loads are absorbed and relaxed. However, a case can occur in which the impact load is not fully absorbed. In this case, residual loads cause the outer shaft to retract with respect to the other inner shaft in the second shock absorbing section. The loads then cause the outer shaft to slide about the other inner shaft by a second shock absorption stroke. In this manner, the impact loads are further absorbed and relaxed.

In the propeller shaft assembly described by Reference Document 1, in the stage where the mutually adjacent first and second shock absorbing sections act in series to absorb and relax impact loads, the two inner shafts slide in series into the outer shaft by the first and second shock absorption strokes. However, since the two inner shafts are disposed along the same axis, the outer shaft needs to have a marginal length to be longer than the total length of the first and second shock absorption stroke. Consequently, the overall length of the propeller assembly shaft needs to be increased, accordingly leading to an excessive increase in the weight of the shaft.

To solve this problem, another object of the invention is to secure predetermined shock absorption strokes without increasing the overall length of the propeller shaft assembly in which a plurality of shock absorbing sections are disposed.

SUMMARY OF THE INVENTION

The present invention relates to a propeller shaft assembly comprising a shock absorbing section(s) that couples an outer shaft and an inner shaft that are mutually spline-engaged to be retractable with impact loads. The shock absorbing section is constructed such that a supporting member is press-fit into an inner-diameter portion of the outer shaft, and an end face of the inner shaft is disposed in contact with the supporting member in a direction of retraction with respect to the outer shaft.

The present invention relate to a propeller shaft assembly comprising a shock absorbing section(s) that couples an outer shaft and an inner shaft that are mutually spline-engaged to be retractable with impact loads. The shock absorbing section is constructed such that a supporting member axially fitted to the inner shaft is press-fit into an inner-diameter portion of the outer shaft.

The present invention relate to a propeller shaft assembly comprising a shock absorbing section(s) that couples an outer shaft and an inner shaft that are mutually spline-engaged to be retractable with impact loads. In the shock absorbing section, a supporting member is press-fit into an inner-diameter portion of the outer shaft. In the outer shaft, a splined portion is smaller in diameter than a press-fit inner diameter portion provided for the supporting member, and a stepped portion is provided between the press-fit inner diameter portion and the splined portion. A stop ring fitted to an end face of the inner shaft is press-held by a pressing portion of the supporting member to the stepped portion.

The present invention relates to a propeller shaft assembly comprising a shock absorbing section(s) that couples an outer shaft and an inner shaft that are mutually spline-engaged to be retractable with impact loads. A plurality of the shock absorbing sections are axially disposed in alignment. Between mutually adjacent shock absorbing sections, when an outer shaft or an inner shaft of at least the one shock absorbing section retracts, a free-fit preparation portion enables free fitting so that the outer shaft or the inner shaft of the one shock absorbing section axially laps relatively with an outer shaft or an inner shaft of the other shock absorbing section. The free-fit preparation portion is preliminarily provided in the outer shaft or the inner shaft of the other shock absorbing section.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
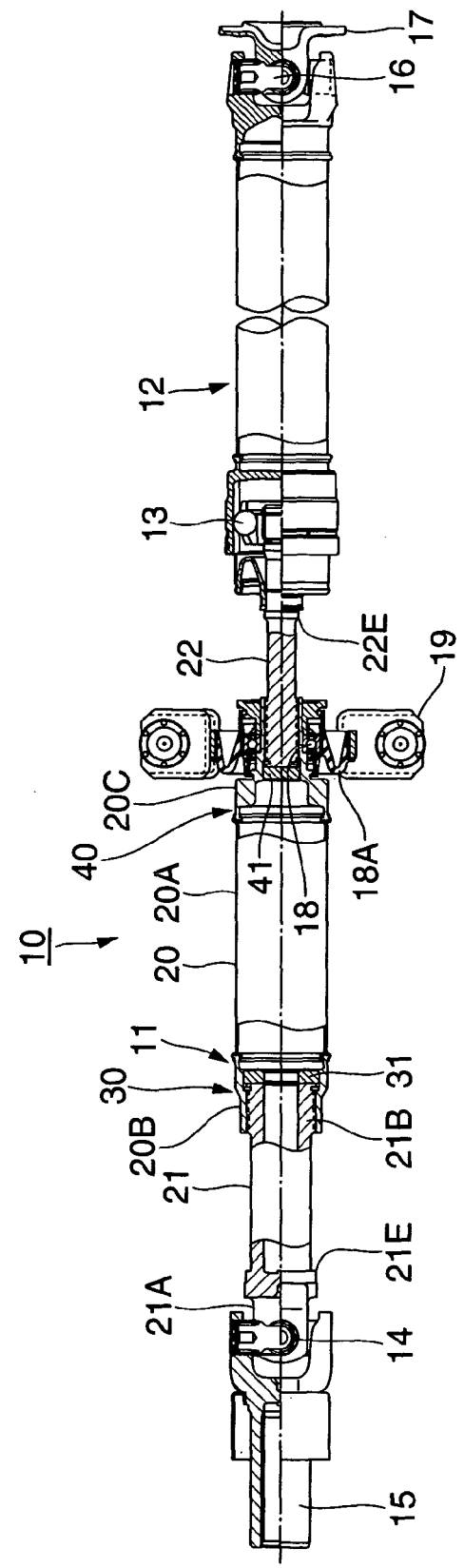
FIG. 1 is a plan view of a propeller shaft assembly according to a first embodiment of the present invention.
Figure 2:
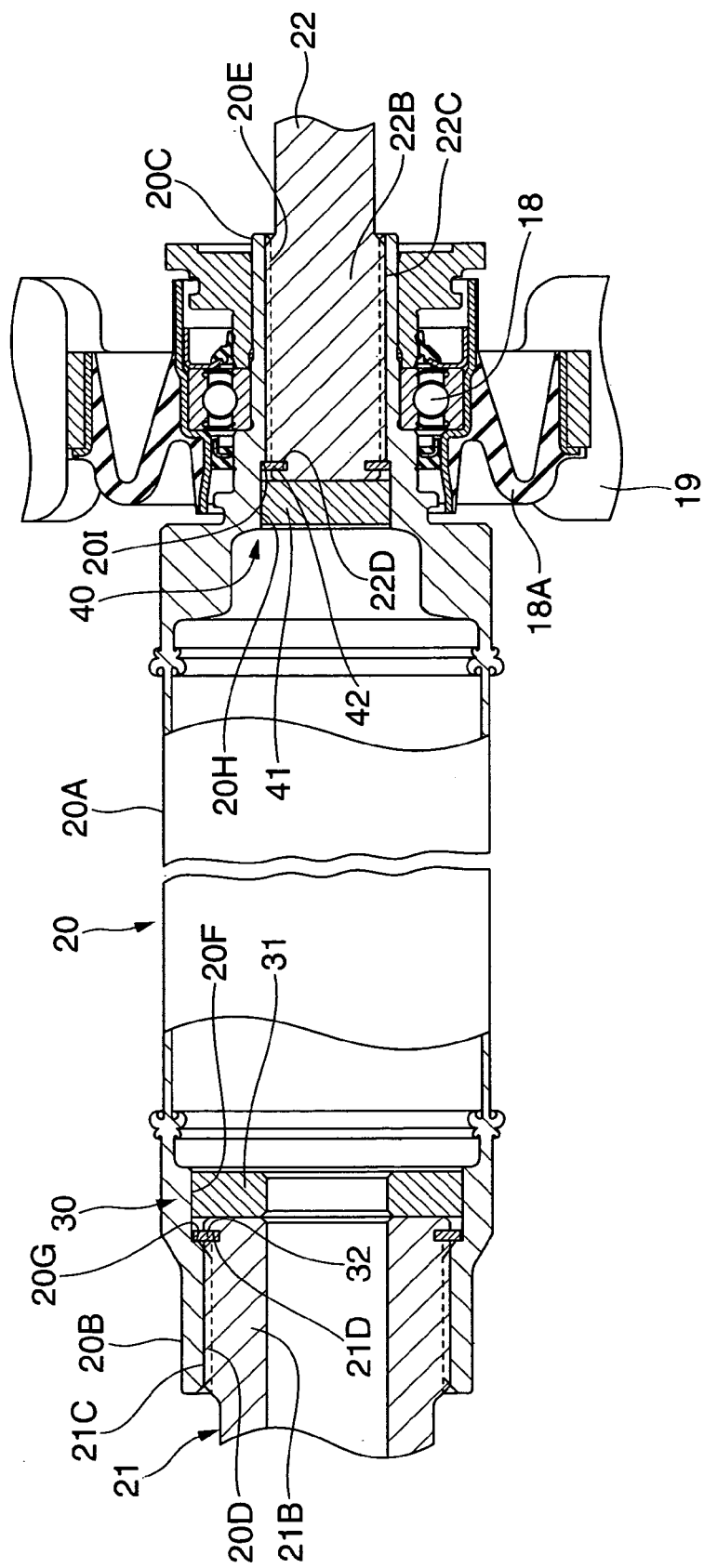
FIG. 2 is an enlarged partially exploded view of major portions of the propeller shaft assembly shown in FIG. 1.

As shown in FIGS. 1, 5, 11, and 15, a propeller shaft assembly 10 includes two divisional shaft members, namely, a front shaft 11 and a rear shaft 12. The two shafts 11 and 12 are coupled via a universal joint 13. A front-end portion of the front shaft 11 is coupled via a universal joint 14 to a coupling yoke 15 that is coupled to an output shaft of a transmission on the side of an engine. A rear end portion of the rear shaft 12 is coupled via a universal joint 16 to a coupling yoke 17 connected to a differential gear set. A second inner shaft 22, described below, of the front shaft 11 is supported by a center bracket 19 via a center bearing 18 and a rubbery resilient member 18A.

To absorb impact loads caused by crushing or the like, the propeller shaft assembly 10 has first and second shock absorbing sections 30 and 40 disposed in alignment in the axial direction of an intermediate portion of the front shaft 11. Specifically, in the front shaft 11, a first inner shaft 21 and a second inner shaft 22 are individually spline-engaged with two end portions of a hollow outer shaft 20. In addition, the first shock absorbing section 30 couples between the outer shaft 20 and the first inner shaft 21 and is retractable with impact loads. Similarly, the second shock absorbing section 40 couples between the outer shaft 20 and the second inner shaft 22 and is retractable with impact loads. The front shaft 11 has the shock absorbing sections 30 and 40 as described in more detail in the following paragraphs.

As shown in FIGS. 2, 6, 12, and 16, a first sleeve 20B is welded to the one end of a steel pipe 20A, a second sleeve 20C is welded to the other end of the steel pipe 20A, and spline teeth 20D and 20E axially extending are formed in inner peripheral surfaces of the respective first and second sleeve 20B and 20C. In the first inner shaft 21, one end 21A is used as a mounting portion of the universal joint 14, the other end 21B is used as a hollow shaft portion, and a spline teeth 21C axially extending are formed in an outer peripheral surface of the other end 21B. The spline teeth 21C is lightly press-fit into spline engagement with the spline teeth 20D of the first sleeve 20B. In the second inner shaft 22, one end 22A is used as an inner-shaft mounting portion of the universal joint 13, which may be a constant velocity joint. Spline teeth 22C which are axially extending are formed in an outer peripheral surface of the other end 22B. The spline teeth 22C are lightly press-fit into spline engagement with spline teeth 20E of the second sleeve 20C.

First Embodiment

Figure 3:
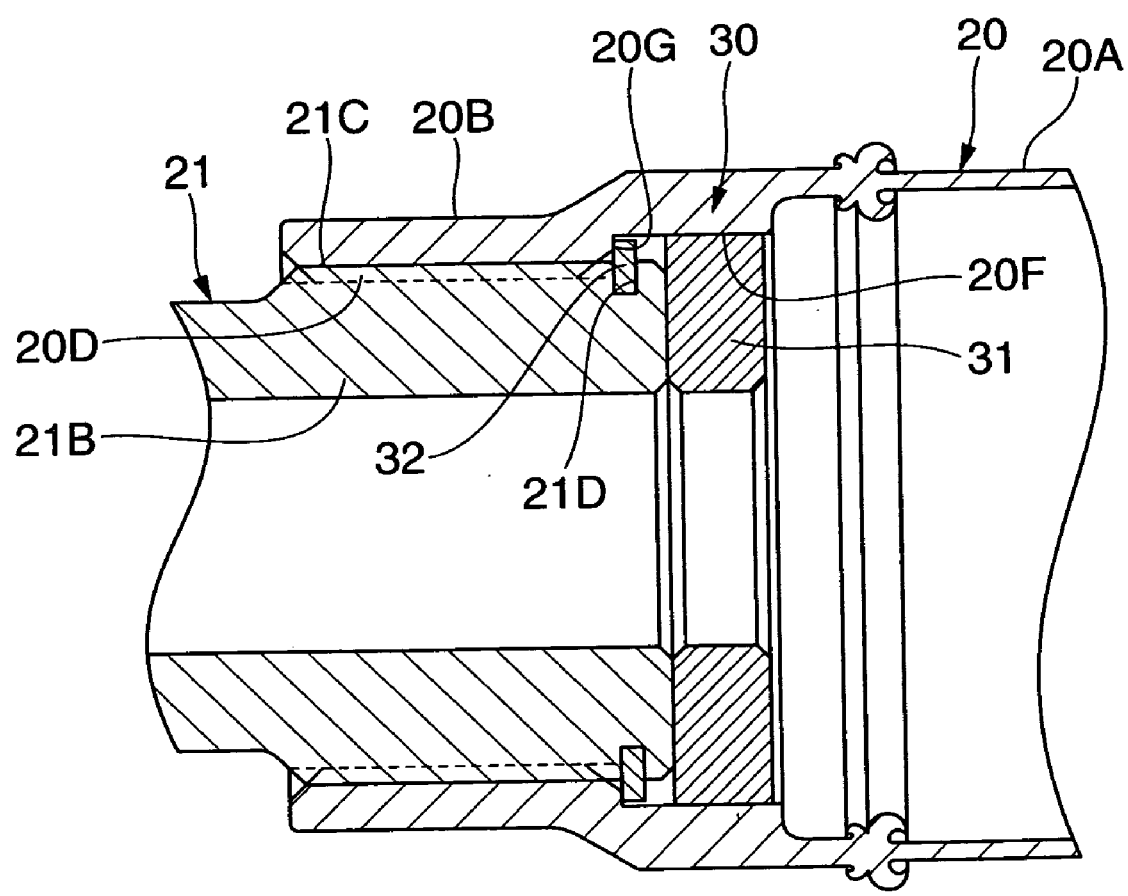
FIG. 3 is a cross-sectional view of a first shock absorbing section.

First Shock Absorbing Section 30. FIG. 3.

In the first shock absorbing section 30, an outer periphery portion of the supporting member 31 formed of an annular collar is press-fit into a press-fit inner diameter portion 20F provided in the first sleeve 20B on the side of the one end of the outer shaft 20. The end face of the first inner shaft 21 is brought into contact with an end face of the supporting member 31 in a retraction direction with respect to the outer shaft 20 (a direction along which the first inner shaft 21 slides into the hollow portion of the outer shaft 20, or a rightward direction as viewed in FIG. 3.)

The diameter of the spline teeth 20D of the first sleeve 20B on the side of the one end of the outer shaft 20, is formed smaller than the press-fit inner diameter portion 20F provided for the supporting member 31. Thereby, an annular stepped portion 20G is provided between the press-fit inner diameter portion 20F and the spline teeth 20D. A stop ring 32 is fitted into the annular groove 21D provided in a lateral side portion on the outer end side for the spline teeth 21C of the other end 21B of the first inner shaft 21, and is brought into engagement with the annular stepped portion 20G. In this embodiment, the supporting member 31 is press-fit into contact with the end face of the first inner shaft 21 in the direction of extension with respect to the outer shaft 20. Thereby, the supporting member 31 presses the stop ring 32, which is fitted into the annular groove 21D of the first inner shaft 21, to the stepped portion 20G, and supports the stop ring 32. Consequently, the outer shaft 20 and the first inner shaft 21 are integrally assembled together to avoid axial vibration, and the projection position or assembly position of the first inner shaft 21 is determined with respect to the outer shaft 20.

The first shock absorbing section 30 is assembled according to steps as described hereunder.

(1) Light press-fit is performed for the spline teeth 20D provided in the first sleeve 20B of the outer shaft 20 and for the spline teeth 21C provided in other end 21B of the first inner shaft 21. The outer shaft 20 and the first inner shaft 21 are axially slid or retracted until the annular groove 21D of the first inner shaft 21 projects outwardly, and the stop ring 32 is fitted into the annular groove 21D.

(2) The outer shaft 20 and the first inner shaft 21 are axially slid or extended until the stop ring 32 fitted into the first inner shaft 21 contacts and engages the annular stepped portion 20G of the first sleeve 20B of the outer shaft 20. Thereby, the projection position or assembly position of the first inner shaft 21 is determined with respect to the outer shaft 20.

(3) The supporting member 31 is press-fit into the press-fit inner diameter portion 20F of the first sleeve 20B of the outer shaft 20. In this case, while the structure is being secured such that the stop ring 32 is engaged with the annular stepped portion 20G of the first sleeve 20B, the end face of the first inner shaft 21 is brought into contact with the end face of the supporting member 31.

(4) The one end of the steel pipe 20A is welded to the first sleeve 20B of the outer shaft 20.

Figure 4:
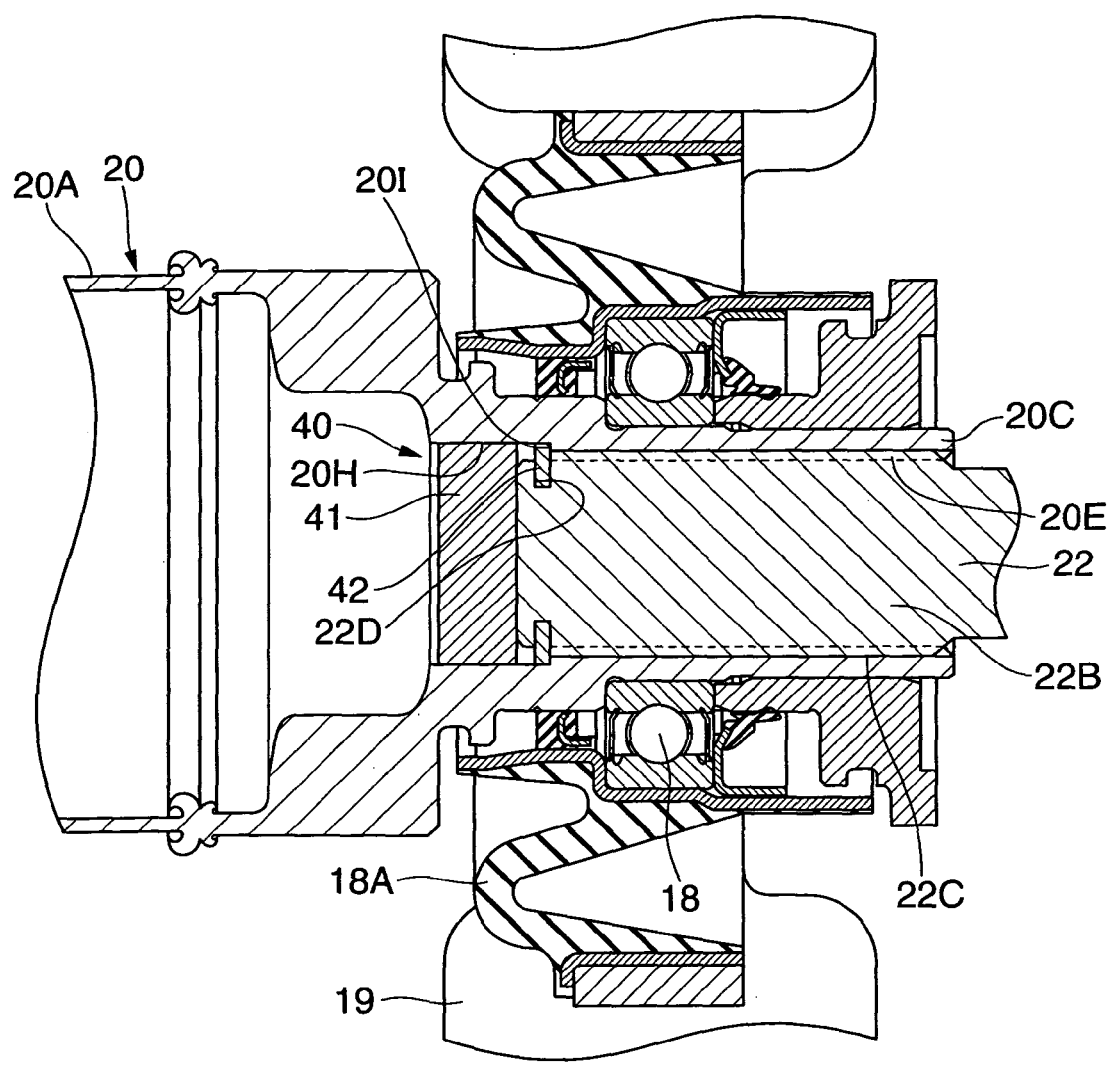
FIG. 4 is a cross-sectional view of a second shock absorbing section.
Figure 5:
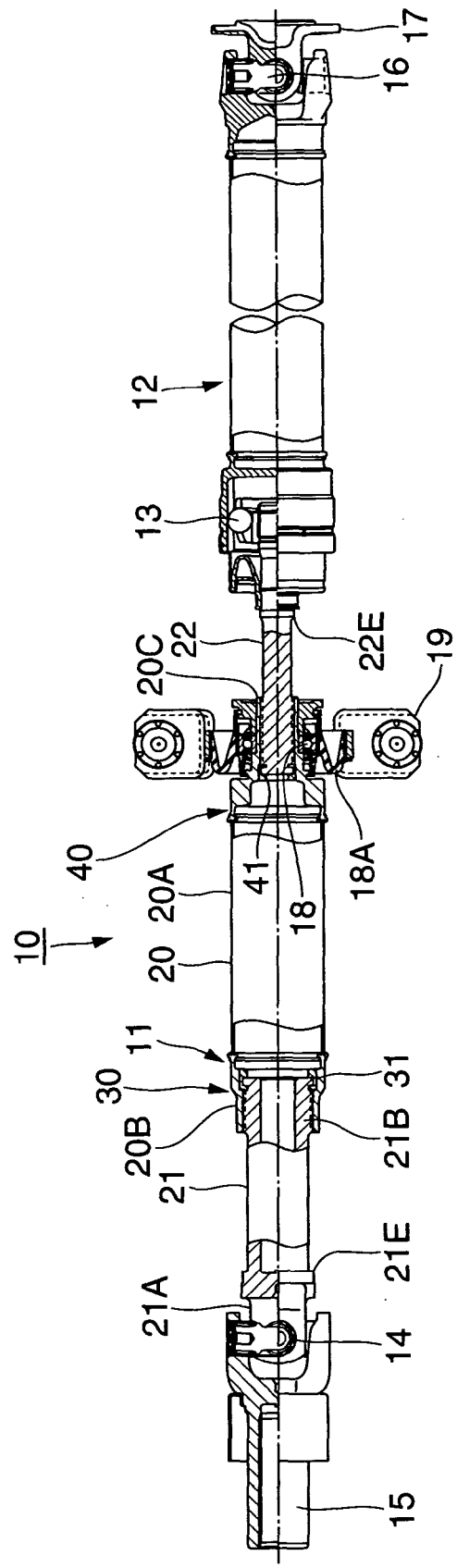
FIG. 5 is a plan view of a propeller shaft assembly according to a second embodiment of the present invention.
Figure 6:
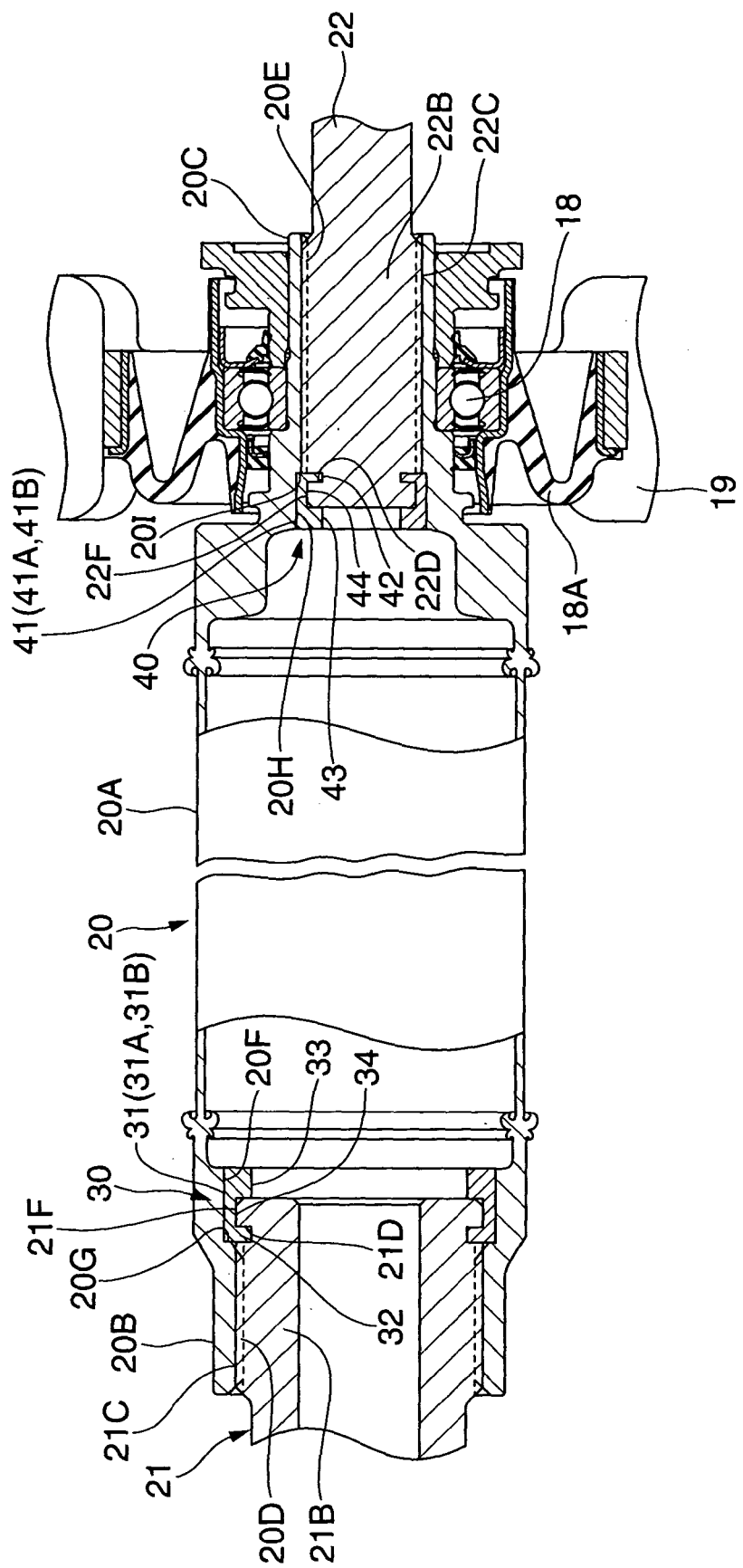
FIG. 6 is an enlarged partially exploded view of major portions of the propeller shaft assembly shown in FIG. 5.

Second Shock Absorbing Section 40. FIG. 4.

In the second shock absorbing section 40, an outer periphery portion of the supporting member 41 formed of an annular collar is press-fit into a press-fit inner diameter portion 20H provided to the second sleeve 20C on the side of the other end of the outer shaft 20. In addition, the end face of the second inner shaft 22 is brought into contact with an end face of the supporting member 41 in a retraction direction with respect to the outer shaft 20 (a direction along which the second inner shaft 22 slides into the hollow portion of the outer shaft 20, or a leftward direction as viewed in FIG. 4).

The diameter of the spline teeth 20E of the second sleeve 20C on the side of the other end of the outer shaft 20, is formed smaller than the press-fit inner diameter portion 20H provided for the supporting member 41. Thereby, an annular stepped portion 20I is provided between the press-fit inner diameter portion 20H and the spline teeth 20E. A stop ring 42 is fitted into the annular groove 22D provided in a lateral side portion on the outer end side for the spline teeth 22C of the other end 22B of the second inner shaft 22, and is brought into engagement with the annular stepped portion 20I. In this case, the supporting member 41 is press-fit into contact with the end face of the second inner shaft 22 in the direction of extension with respect to the outer shaft 20. Thereby, the supporting member 41 presses the stop ring 42, which is fitted into the annular groove 22D of the second inner shaft 22, to the stepped portion 20I and supports the stop ring 42. Consequently, the outer shaft 20 and the second inner shaft 22 are integrally assembled together to avoid axial vibration, and the projection position or assembly position of the second inner shaft 22 is determined with respect to the outer shaft 20.

The second shock absorbing section 40 is assembled according to steps as described hereunder.

(1) Light press-fit is performed for the spline teeth 20E provided in the second sleeve 20C of the outer shaft 20 and for the spline teeth 22C provided in other end 22B of the second inner shaft 22.

The outer shaft 20 and the second inner shaft 22 are axially slid or retracted until the annular groove 22D of the second inner shaft 22 projects outwardly, and the stop ring 42 is fitted into the annular groove 22D.

(2) The outer shaft 20 and the second inner shaft 22 are axially slid or (extended) until the stop ring 42 fitted into the second inner shaft 22 contacts and engages the annular stepped portion 20I of the second sleeve 20C of the outer shaft 20. Thereby, the projection position or assembly position of the second inner shaft 22 is determined with respect to the outer shaft 20.

(3) The supporting member 41 is press-fit into the press-fit inner diameter portion 20H of the second sleeve 20C of the outer shaft 20. In this case, while the structure is being secured such that the stop ring 42 is engaged with the annular stepped portion 20I of the second sleeve 20C, the end face of the second inner shaft 22 is brought into contact with the end face of the supporting member 41.

(4) The other end of the steel pipe 20A is welded to the second sleeve 20C of the outer shaft 20.

Operation of the propeller shaft assembly 10 will be described hereinbelow.

Impact loads may be exerted on the engine from a front portion of the vehicle after deformed crushable zones such as an engine room of the vehicle have exhausted their capacity to absorb energy. In this case, the impact loads are then absorbed and relaxed sequentially in the transmission, front shaft 11 of the propeller shaft assembly 10, the first shock absorbing section 30 of the front shaft 11, and the second shock absorbing section 40 of the front shaft 11.

More specifically, in the first shock absorbing section 30, the impact loads lead to spline disengagement between the spline teeth 20D of the first sleeve 20B of the outer shaft 20 and the spline teeth 21C of the other end 21B of the first inner shaft 21. Further, the impact loads cause disengagement of the supporting member 31 press-fit into the press-fit inner diameter portion 20F of the first sleeve 20B of the outer shaft 20. This causes the other end 21B of the first inner shaft 21 to slide into the steel pipe 20A of the outer shaft 20, whereby the outer shaft 20 and the first inner shaft 21 are retracted relative to each other. The impact loads are absorbed and relaxed by energy causing the supporting member 31 to be disengaged from the press-fit inner diameter portion 20F of the first sleeve 20B and relative displacement therebetween. The movement of the first inner shaft 21 stops upon contact of a stopper portion 21E or flange, shown in FIG. 1 on the side of the one end 21A of the first inner shaft 21 with the end face of the first sleeve 20B of the outer shaft 20.

In the case that full impact loads cannot be absorbed in the first shock absorbing section 30, the stopper portion 21E on the side of the one end 21A of the first inner shaft 21 is contact with the end face of the first sleeve 20B of the outer shaft 20. Thereby, the impact loads are exerted on the side of the second shock absorbing section 40 via the outer shaft 20 and are further absorbed in the second shock absorbing section 40 as in the first shock absorbing section 30. That is, the impact loads cause a release of the spline engagement between the spline teeth 20E of the second sleeve 20C of the outer shaft 20 and the spline teeth 22C of the other end 22B of the second inner shaft 22. Further, the impact loads cause disengagement of a supporting member 41 press-fit into a press-fit inner diameter portion 20H of the second sleeve 20C of the outer shaft 20. Thereby, the loads permit the other end 22B of the second inner shaft 22 to slide into the steel pipe 20A of the outer shaft 20 and consequently cause the outer shaft 20 and the second inner shaft 22 to be retracted relative to each other. In this case, the steel pipe 20A of the outer shaft 20 and the second sleeve 20C move by breaking through the rubbery resilient member 18A of the center bracket 19. In this manner, the impact loads are effectively absorbed and relaxed by energy that acts to disengage the supporting member 41 from the press-fit inner diameter portion 20H of the second sleeve 20C and relative displacement therebetween. The movement of the outer shaft 20 stops upon contact the end face of the second sleeve 20C of the outer shaft 20 with a stopper portion 22E, shown in FIG. 1, on the side of the one end 22A of the second inner shaft 22.

In each of the shock absorbing sections 30 and 40, the press-fit strength for each of the supporting members 31 and 41 is set to a level that does not allow a fatal shock to be transmitted to passengers in the vehicle cabin at the time of input of impact loads.

The present embodiment exhibits operational advantages as described hereunder.

(1) The shock absorbing sections 30 and 40 are constructed such that the supporting members 31 and 41 are press-fit into the inner-diameter portions of the outer shaft 20. Accordingly, processing and assembly are easy, and costs can be reduced.

(2) The supporting members 31 and 41 to be press-fit into the outer shaft 20 are members independent of the inner shafts 21 and 22. Accordingly, the influence of vibration in the rotational direction of the spline engagements between the outer shaft 20 and the inner shafts 21 and 22 does not extend to the press-fit portions of the supporting members 31 and 41. Consequently, the press-fit strength of the supporting members 31 and 41 into the outer shaft 20 can be set with high accuracy for impact loads.

(3) The end faces of inner shafts 21 and 22 are brought into contact with the supporting members 31 and 41 in the retraction direction with respect to the outer shaft 20. In addition, the stop rings 32 and 42 fitted to the end portions of the inner shafts 21 and 22 are brought into engagement with the stepped portions 20G and 20I between the press-fit inner diameter portions 20F and 20H and the spline teeth 20D and 20E of the supporting members 31 and 41 of the outer shaft 20. Accordingly, the inner shafts 21 and 22 can be prevented from becoming disengaged from the outer shaft 20. Concurrently, the projection positions of the inner shafts 21 and 22 with respect to the outer shaft 20 can be determined. Further, the distance of the movements or shock absorption strokes of the inner shafts 21 and 22 can be determined.

(4) The plurality of shock absorbing sections, namely the shock absorbing sections 30 and 40, are axially disposed in alignment. Accordingly, impact loads can be sequentially absorbed by the shock absorbing sections 30 and 40. Consequently, the shock absorbing performance of the propeller shaft assembly 10 can be improved.

Second Embodiment

Figure 7:
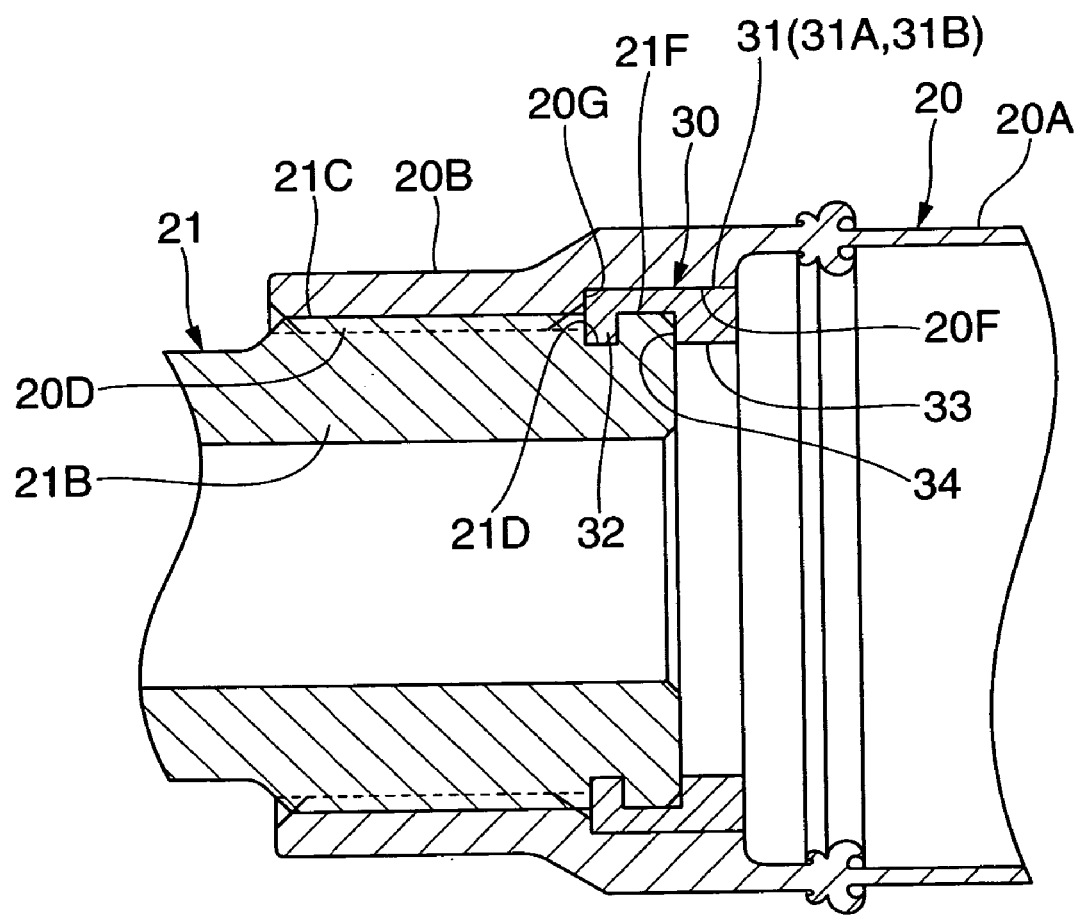
FIG. 7 is a cross-sectional view of a first shock absorbing section.
Figure 9:
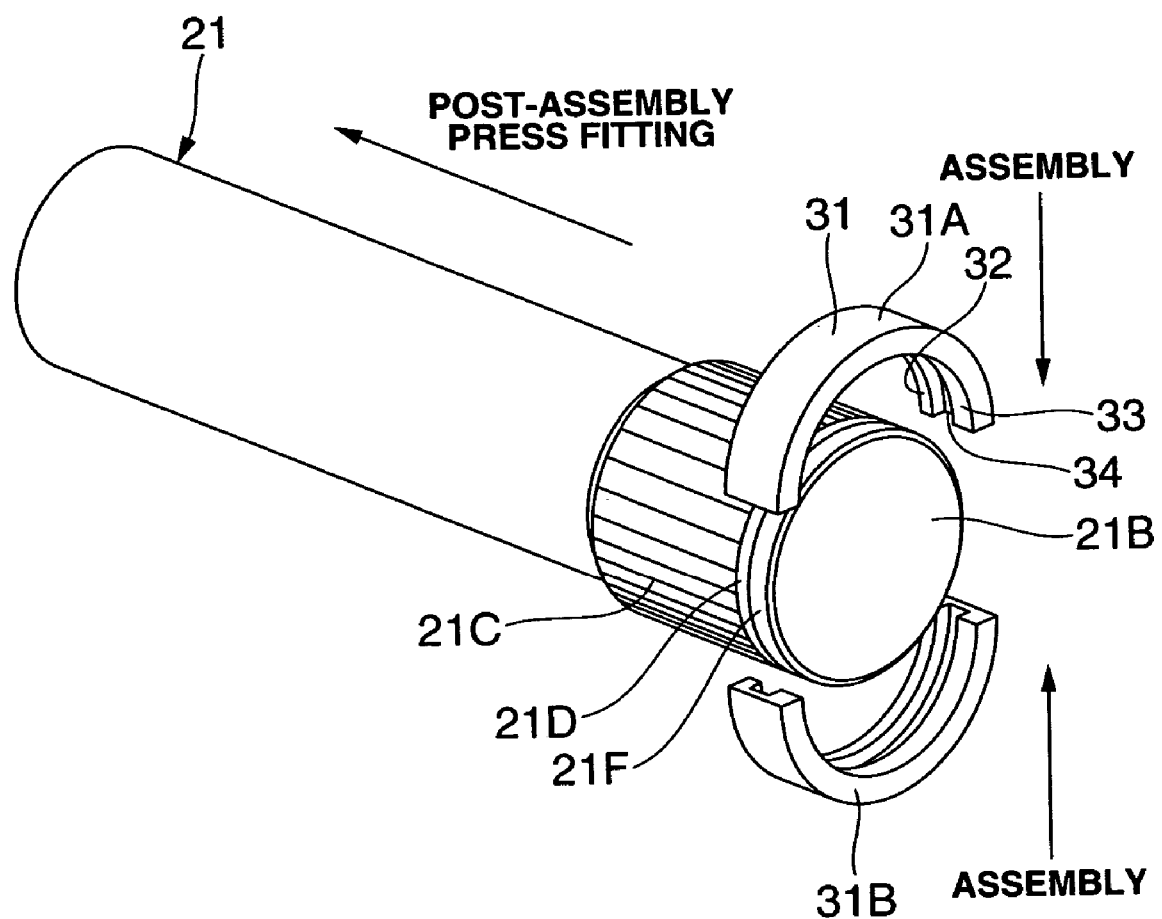
FIG. 9 is a perspective view depicting the step of fitting a supporting member to an inner shaft.
Figure 10:
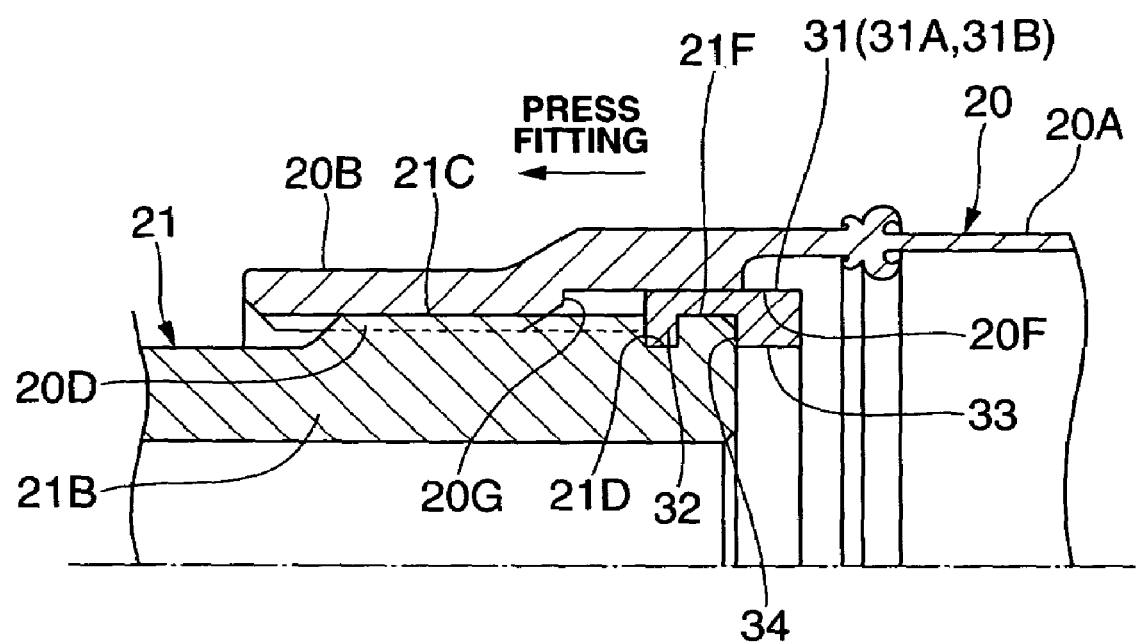
FIG. 10 is a cross-sectional view depicting the step of press-fitting the supporting member into an outer shaft.

First Shock Absorbing Section 30. FIGS. 7, 9, and 10.

In the first shock absorbing section 30, the outer peripheral portion of the supporting member 31 is press-fit into a press-fit inner diameter portion 20F provided in the first sleeve 20B on the side of one end of the outer shaft 20. The supporting member 31 is formed of an annular collar and is axially attached to the other end 21B of the first inner shaft 21. The supporting member 31 has an annular projection portion 32 on an inner periphery on the side of one end of a cylindrical body having an outer peripheral portion that is to be press-fit into the press-fit inner diameter portion 20F. The annular projection portion 32 is fitted into an annular groove 21D provided in a lateral side portion on the outer end for a spline teeth 21C of the other end 21B of a first inner shaft 21. Thereby, the first inner shaft 21 assumes an integrally assembled state in two directions comprising a retraction direction, which is a direction along which the first inner shaft 21 slides into a hollow portion of the outer shaft 20 or a rightward direction as viewed in FIG. 3, and an extension direction with respect to the outer shaft 20. The supporting member 31 has an annular projection portion 33 also at the other end of the cylindrical body. An annular projection portion 21F between the annular groove 21D and the end of the first inner shaft 21 is brought into engagement with an annular concave portion 34 between the annular projection portion 32 and the annular projection portion 33. However, the annular projection portion 33 is not mandatory.

As shown in FIG. 9, the supporting member 31 is formed of a plurality of divided collar portions. Particularly, it is formed of two halves, namely divided collar members 31A and 31B. The divided collar members 31A and 31B are assembled and fitted into the annular groove 21D provided on the outer periphery of the first inner shaft 21. As shown in FIG. 10, the supporting member 31 is press-fit into the press-fit inner diameter portion 20F of the outer shaft 20 after the divided collar members 31A and 31B are assembled and fitted into the annular groove 21D of the first inner shaft 21.

The diameter of the spline teeth 20D of the first sleeve 20B on the side of the one end of the outer shaft 20 is formed smaller than the press-fit inner diameter portion 20F provided for the supporting member 31. Thereby, an annular stepped portion 20G is provided between the press-fit inner diameter portion 20F and the spline teeth 20D. The supporting member 31 to be press-fit into the press-fit inner diameter portion 20F of the outer shaft 20 hits the stepped portion 20G at the end of the press-fit step. Consequently, this enables the projection position or assembly position of the first inner shaft 21 to easily be determined with respect to the outer shaft 20.

The first shock absorbing section 30 is assembled according to steps as described hereunder.

(1) Light press-fit is performed for the spline teeth 20D provided in the first sleeve 20B of the outer shaft 20 and for the spline teeth 21C provided in other end 21B of the first inner shaft 21.

(2) The outer shaft 20 and the first inner shaft 21 are axially slid or retracted until the annular groove 21D of the first inner shaft 21 projects outwardly, and the supporting member 31, which may comprise divided collar members 31A and 31B, is fitted into the annular groove 21D.

(3) The outer shaft 20 and the first inner shaft 21 are axially slid or extended until the supporting member 31 fitted into the first inner shaft 21 reaches the press-fit inner diameter portion 20F of the outer shaft 20. Thereby, the supporting member 31 is press-fit into the press-fit inner diameter portion 20F of the outer shaft 20. In this case, the supporting member 31 is pressed thereinto until the end face of the supporting member 31 hits the annular stepped portion 20G of the outer shaft 20, and the projection position or assembly position of the first inner shaft 21 is determined with respect to the outer shaft 20.

(4) The one end of the steel pipe 20A is welded to the first sleeve 20B of the outer shaft 20.

Figure 8:
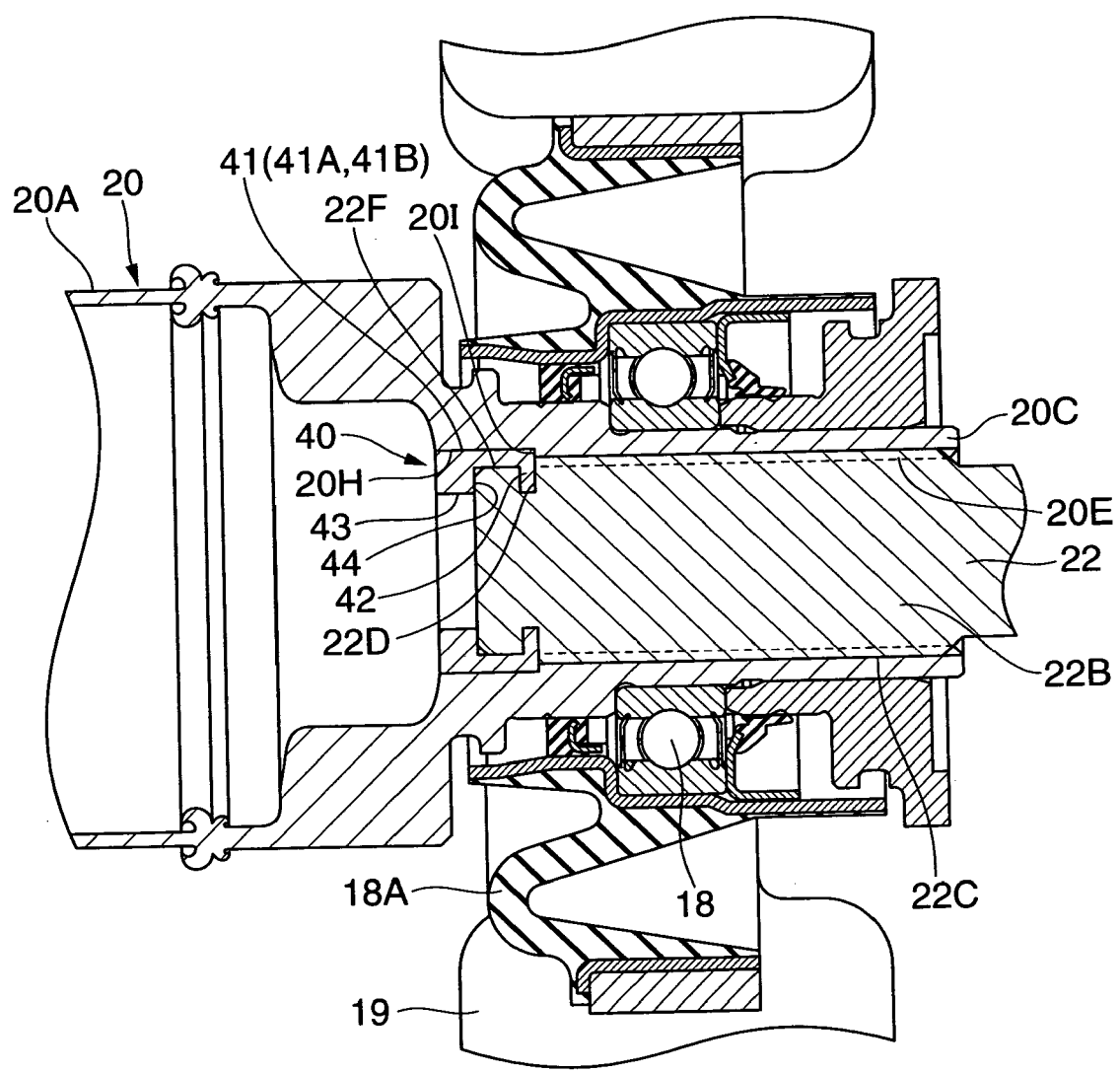
FIG. 8 is a cross-sectional view of a second shock absorbing section.

Second Shock Absorbing Section 40. FIG. 8.

In the second shock absorbing section 40, the outer peripheral portion of the supporting member 41 is press-fit into a press-fit inner diameter portion 20H provided in the second sleeve 20C on the side of the other end of the outer shaft 20. The supporting member 41 is formed of an annular collar and is axially attached to the other end 22B of the second inner shaft 22. The supporting member 41 has an annular projection portion 42 on an inner periphery on the side of one end of a cylindrical body having an outer peripheral portion that is to be press-fit into the press-fit inner diameter portion 20H. The annular projection portion 42 is fitted into an annular groove 22D provided in a lateral side portion on the outer end for a spline teeth 22C of the other end 22B of a second inner shaft 22. Thereby, the second inner shaft 22 assumes an integrally assembled state in two directions comprising a retraction direction, which is a direction along which the second inner shaft 22 slides into a hollow portion of the outer shaft 20 or a leftward direction as viewed in FIG. 8, and an extension direction with respect to the outer shaft 20. The supporting member 41 has an annular projection portion 43 also at the other end of the cylindrical body. An annular projection portion 22F between the annular groove 22D and the end of the second inner shaft 22 is brought into engagement with an annular concave portion 44 between the annular projection portion 42 and the annular projection portion 43. However, the annular projection portion 43 is not mandatory.

Similar to the supporting member 31 in FIG. 9, the supporting member 41 is formed of a plurality of divided collar portions. Particularly, it is formed of two halves, namely divided collar members 41A and 41B. The divided collar members 41A and 41B are assembled and fitted into the annular groove 22D provided on the outer periphery of the second inner shaft 22. The supporting member 41 is press-fit into the press-fit inner diameter portion 20H of the outer shaft 20 after the divided collar members 41A and 41B are assembled and fitted into the annular groove 22D of the second inner shaft 22.

The diameter of the spline teeth 20E of the second sleeve 20C on the side of the one end of the outer shaft 20 is formed smaller than the press-fit inner diameter portion 20H provided for the supporting member 41. Thereby, an annular stepped portion 20I is provided between the press-fit inner diameter portion 20H and the spline teeth 20E. The supporting member 41 to be press-fit into the press-fit inner diameter portion 20H of the outer shaft 20 hits the stepped portion 20I at the end of the press-fit step. Consequently, this enables the projection position or assembly position of the second inner shaft 22 to easily be determined with respect to the outer shaft 20.

The second shock absorbing section 40 is assembled according to steps as described hereunder.

(1) Light press-fit is performed for the spline teeth 20E provided in the second sleeve 20C of the outer shaft 20 and for the spline teeth 22C provided in other end 22B of the second inner shaft 22.

(2) The outer shaft 20 and the second inner shaft 22 are axially slid or retracted until the annular groove 22D of the second inner shaft 22 projects outwardly, and the supporting member 41, which may comprise divided collar members 41A and 41B, is fitted into the annular groove 22D.

(3) The outer shaft 20 and the second inner shaft 22 are axially slid or extended until the supporting member 41 fitted into the second inner shaft 22 reaches the press-fit inner diameter portion 20H of the outer shaft 20. Thereby, the supporting member 41 is press-fit into the press-fit inner diameter portion 20I of the outer shaft 20. In this case, the supporting member 41 is pressed thereinto until the end face of the supporting member 41 hits the annular stepped portion 20I of the outer shaft 20, and the projection position or assembly position of the second inner shaft 22 is determined with respect to the outer shaft 20.

(4) The other end of the steel pipe 20A is welded to the second sleeve 20C of the outer shaft 20.

Operation of the propeller shaft assembly 10 will be described hereinbelow.

Impact loads may be exerted on the engine from a front portion of the vehicle after deformed crushable zones such as an engine room of the vehicle have exhausted their ability to absorb energy. In this case, the impact loads are then absorbed and relaxed sequentially in the transmission, front shaft 11 of the propeller shaft assembly 10, the first shock absorbing section 30 of the front shaft 11, and the second shock absorbing section 40 of the front shaft 11.

More specifically, in the first shock absorbing section 30, the impact loads lead to spline disengagement between the spline teeth 20D of the first sleeve 20B of the outer shaft 20 and the spline teeth 21C of the other end 21B of the first inner shaft 21. Further, the impact loads cause disengagement of the supporting member 31 press-fit into the press-fit inner diameter portion 20F of the first sleeve 20B of the outer shaft 20. This causes the other end 21B of the first inner shaft 21 to slide into the steel pipe 20A of the outer shaft 20, whereby the outer shaft 20 and the first inner shaft 21 are retracted relative to each other. The impact loads are absorbed and relaxed by energy causing the supporting member 31 to be disengaged from the press-fit inner diameter portion 20F of the first sleeve 20B and relative displacement therebetween. The movement of the first inner shaft 21 stops upon contact of a stopper portion 21E or flange, shown in FIG. 5 on the side of the one end 21A of the first inner shaft 21 with the end face of the first sleeve 20B of the outer shaft 20.

In the case that full impact loads cannot be absorbed in the first shock absorbing section 30, the stopper portion 21E on the side of the one end 21A of the first inner shaft 21 is contacted with the end face of the first sleeve 20B of the outer shaft 20. Thereby, the impact loads are exerted on the side of the second shock absorbing section 40 via the outer shaft 20 and are further absorbed in the second shock absorbing section 40 as in the first shock absorbing section 30. That is, the impact loads cause a release of the spline engagement between the spline teeth 20E of the second sleeve 20C of the outer shaft 20 and the spline teeth 22C of the other end 22B of the second inner shaft 22. Further, the impact loads cause disengagement of a supporting member 41 press-fit into a press-fit inner diameter portion 20H of the second sleeve 20C of the outer shaft 20. Thereby, the loads permit the other end 22B of the second inner shaft 22 to slide into the steel pipe 20A of the outer shaft 20 and consequently cause the outer shaft 20 and the second inner shaft 22 to be retracted relative to each other. In this case, the steel pipe 20A of the outer shaft 20 and the second sleeve 20C move by breaking through the rubbery resilient member 18A of the center bracket 19. In this manner, the impact loads are effectively absorbed and relaxed by energy that acts to disengage the supporting member 41 from the press-fit inner diameter portion 20H of the second sleeve 20C and relative displacement therebetween. The movement of the outer shaft 20 stops upon contact the end face of the second sleeve 20C of the outer shaft 20 with a stopper portion 22E, shown in FIG. 5, on the side of the one end 22A of the second inner shaft 22.

In each of the shock absorbing sections 30 and 40, the press-fit strength for each of the supporting members 31 and 41 is set to a level that does not allow a fatal shock to be transmitted to passengers in the vehicle cabin at the time of input of impact loads.

The present embodiment exhibits operational advantages as described hereunder.

(1) The shock absorbing sections 30 and 40 are constructed such that the supporting members 31 and 41 are press-fit into the inner-diameter portions of the outer shaft 20. Accordingly, processing and assembly are easy, and costs can be reduced.

(2) The supporting members 31 and 41 axially fitted to the inner shafts 21 and 22 are press-fit into the inner-diameter portion of the outer shaft 20. Accordingly, the inner shafts 21 and 22 are substantially immovable through the supporting members 31 and 41, not only in the retraction direction but also in the extension direction with respect to the outer shaft 20. Consequently, without a snap ring and/or the like and only with the supporting members 31 and 41 being used, the first and second inner shafts 21 and 22 can be prevented from becoming disengaged from the outer shaft 20. Concurrently, the projection positions of the inner shafts 21 and 22 with respect to the outer shaft 20 can be determined. Further, the movement amounts or shock absorption strokes of the inner shafts 21 and 22 can be determined.

(3) The supporting members 31 and 41 to be press-fit into the outer shaft 20 are members independent of the inner shafts 21 and 22. Accordingly, the influence of vibration in the rotational direction of the spline engagements between the outer shaft 20 and the inner shafts 21 and 22 does not extend to the press-fit portions of the supporting members 31 and 41. Consequently, the press-fit strength of the supporting members 31 and 41 into the outer shaft 20 can be set with high accuracy for impact loads, and reliable durability.

The inner shafts 21 and 22 are not restrained by elements fitting to the supporting members 31 and 41 in the relative rotation with respect to the supporting members 31 and 41.

(4) The supporting members 31 and 41 are formed of the plurality of divided collar members 31A and 31B and 41A and 41B. Accordingly, the respective supporting members 31 and 41 can easily be fitted on the outer peripheries of the inner shafts 21 and 22.

(5) The plurality of shock absorbing sections, namely the shock absorbing sections 30 and 40, are axially disposed in alignment. Impact loads can be sequentially absorbed by the shock absorbing sections 30 and 40. Consequently, the shock absorbing performance of the propeller shaft assembly 10 can be improved.

Third Embodiment

Figure 11:
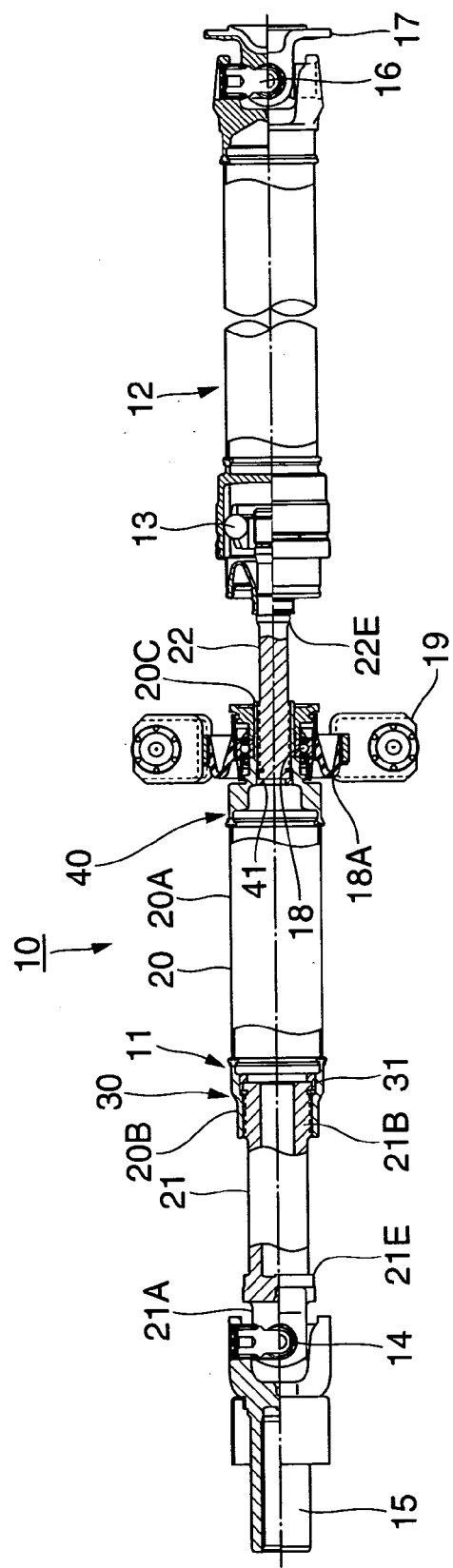
FIG. 11 is a plan view of a propeller shaft assembly according to a third embodiment of the present invention.
Figure 12:
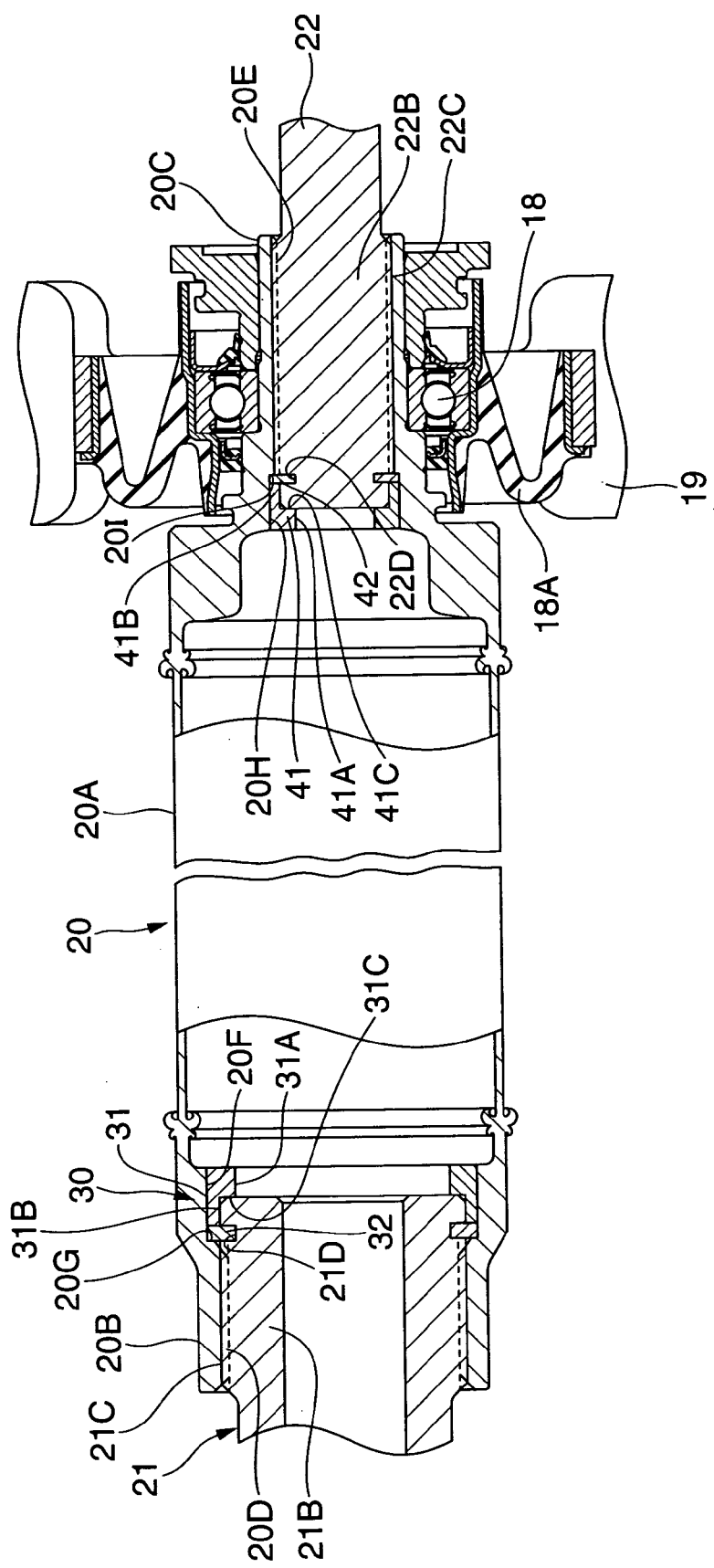
FIG. 12 is an enlarged partially exploded view of major portions of the propeller shaft assembly shown in FIG. 11.
Figure 13:
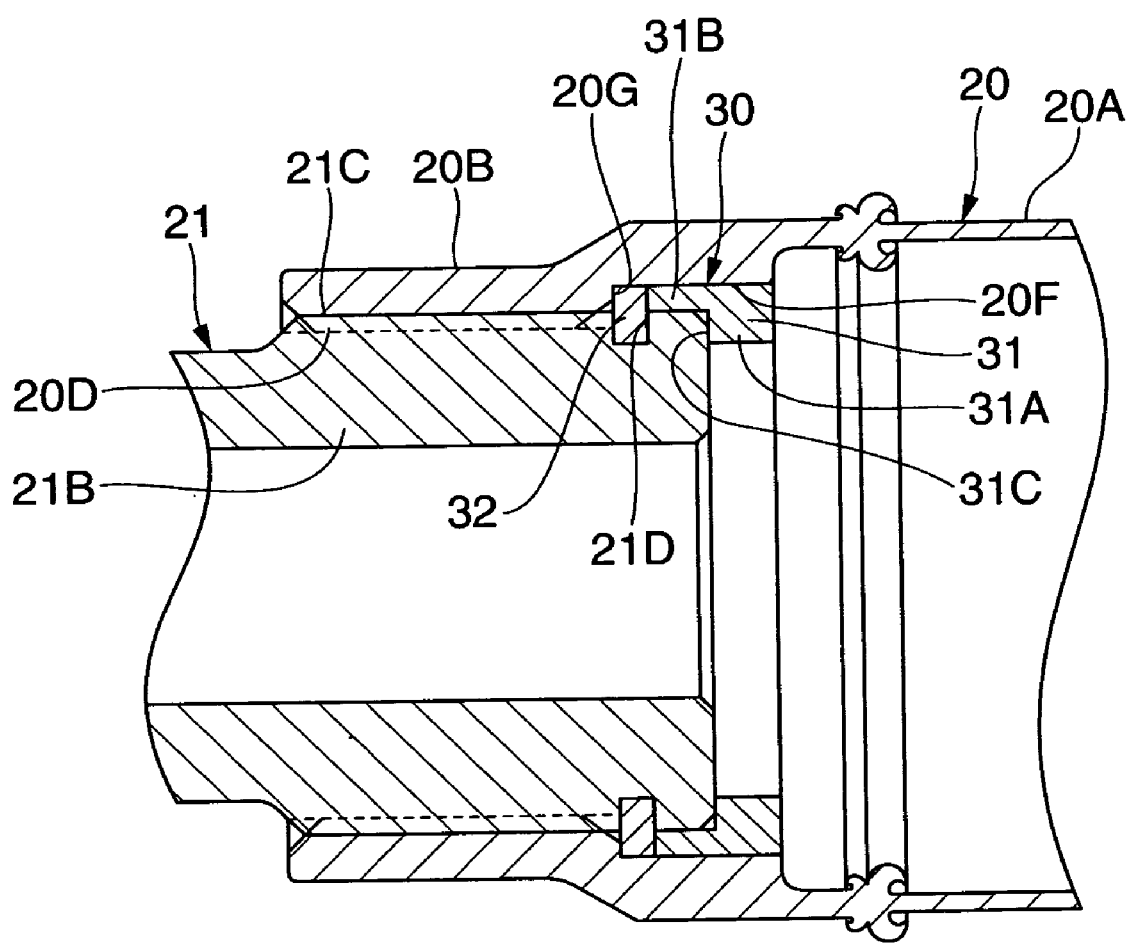
FIG. 13 is a cross-sectional view of a first shock absorbing section.

First Shock Absorbing Section 30. FIG. 11.

In the first shock absorbing section 30, the outer peripheral portion of the supporting member 31 formed of an annular collar is press-fit into the press-fit inner diameter portion 20F provided in the first sleeve 20B on the side of one end of the outer shaft 20. In the supporting member 31, a step is provided on the inner periphery, the side of a small inner diameter portion is used as an supporting section 31A for the first inner shaft 21, and the side of a large inner diameter portion is used as a pressing portion 31B for a stop ring 32, described below.

In the first shock absorbing section 30, the end face of the first inner shaft 21 is brought into contact with the end face of the supporting section 31A of the supporting member 31 in the retraction direction with respect to the outer shaft 20, which is a direction along which the first inner shaft 21 slides into a hollow portion of the outer shaft 20, or a rightward direction as viewed in FIG. 11.

The diameter of the spline teeth 20D of the first sleeve 20B on the side of the one end of the outer shaft 20, is formed smaller than the press-fit inner diameter portion 20F provided for the supporting member 31. Thereby, an annular stepped portion 20G is provided between the press-fit inner diameter portion 20F and the spline teeth 20D. A stop ring 32 is fitted into the annular groove 21D provided in a lateral side portion on the outer end side for the spline teeth 21C of the other end 21B of the first inner shaft 21, and is brought into engagement with the annular stepped portion 20G. At this time, the end face of the pressing portion 31B of the supporting member 31 contacts the side face of the stop ring 32 and press-holds the stop ring 32 to the annular stepped portion 20G. Consequently, the outer shaft 20 and the first inner shaft 21 are integrally assembled together to avoid axial vibration, and the projection position or assembly position of the first inner shaft 21 is determined with respect to the outer shaft 20. In the assembled state, an end face 31C of the supporting portion 31A of supporting member 31 (a stepped face between a supporting portion 31A and the pressing portion 31B), and a face opposite to a radial inner peripheral surface of the pressing portion 31B, may be free-fitted via a spacing between these faces and the end face of the first inner shaft 21 and the outer surface thereof. Alternatively, the aforementioned faces may be in contact with the end face of the first inner shaft 21 and the outer face thereof.

The first shock absorbing section 30 is assembled according to steps as described hereunder.

(1) Light press-fit is performed for the spline teeth 20D provided in the first sleeve 20B of the outer shaft 20 and for the spline teeth 21C provided in other end 21B of the first inner shaft 21. The outer shaft 20 and the first inner shaft 21 are axially slid or retracted until the annular groove 21D of the first inner shaft 21 projects outwardly, and the stop ring 32 is fitted into the annular groove 21D.

(2) The outer shaft 20 and the first inner shaft 21 are axially slid or extended until the stop ring 32 fitted into the first inner shaft 21 contacts and engages the annular stepped portion 20G of the first sleeve 20B of the outer shaft 20. Thereby, the projection position or assembly position of the first inner shaft 21 is determined with respect to the outer shaft 20.

(3) The supporting member 31 is press-fit into the press-fit inner diameter portion 20F of the first sleeve 20B of the outer shaft 20. In this case, where the stop ring 32 is engaged with the annular stepped portion 20G of the first sleeve 20B, the end face of the pressing portion 31B of the supporting member 31 is brought into contact with the stop ring 32 fitted into the annular groove 21D of the first inner shaft 21.

Steps (2) and (3) may be performed concurrently with the press-fit of the supporting member 31 in appropriate combinations.

(4) The one end of the steel pipe 20A is welded to the first sleeve 20B of the outer shaft 20.

Figure 14:
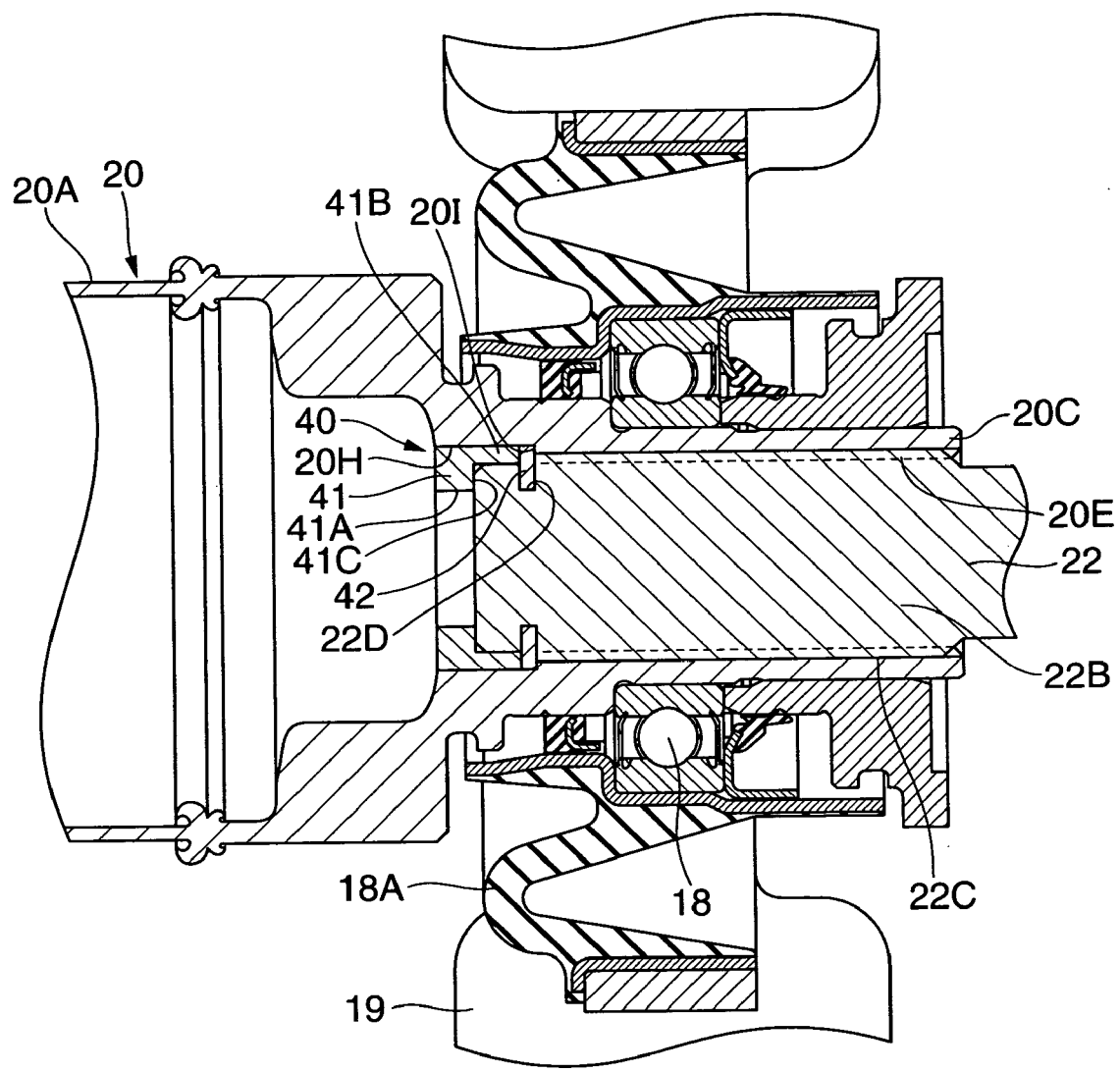
FIG. 14 is a cross-sectional view of a second shock absorbing section.
Figure 15:
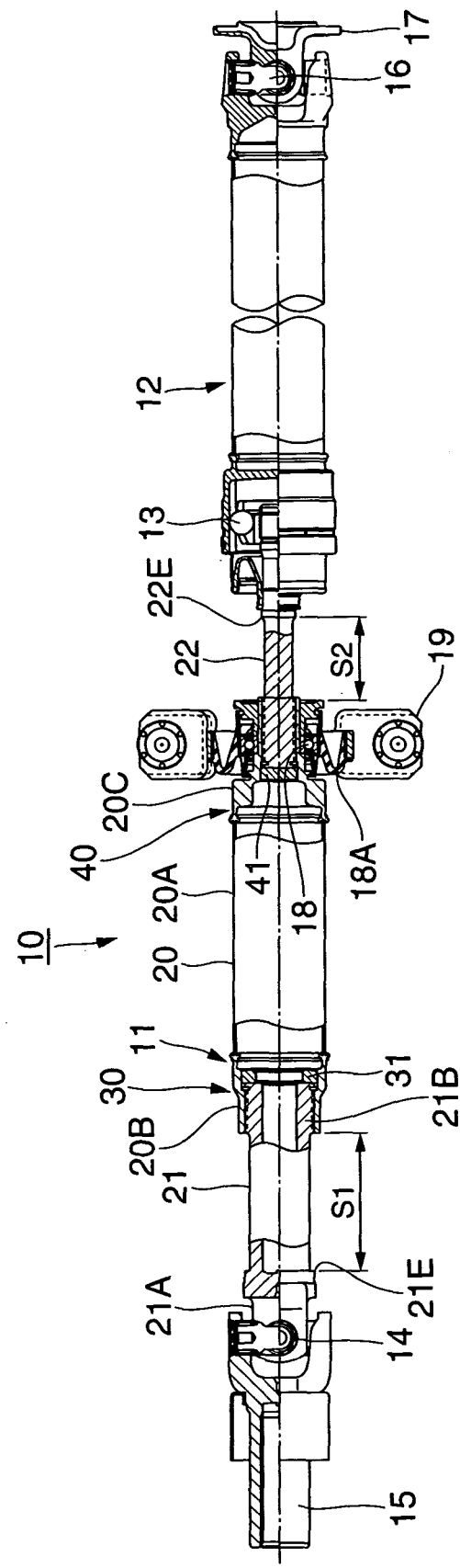
FIG. 15 is a plan view of a propeller shaft assembly according to a fourth embodiment of the present invention.

Second Shock Absorbing Section 40. FIG. 14.

In the second shock absorbing section 40, the outer peripheral portion of the supporting member 41 formed of an annular collar is press-fit into the press-fit inner diameter portion 20H provided in the second sleeve 20C on the side of one end of the outer shaft 20. In the supporting member 41, a step is provided on the inner periphery. The side of a small inner diameter portion is used as a supporting section 41A for the second inner shaft 22, and the side of a large inner diameter portion is used as a pressing portion 41B for a stop ring 42, described below.

In the first shock absorbing section 40, the end face of the second inner shaft 22 is brought into contact with the end face of the supporting section 41A of the supporting member 41 in the retraction direction with respect to the outer shaft 20, (a direction along which the second inner shaft 22 slides into a hollow portion of the outer shaft 20, or a rightward direction as viewed in FIG. 14).

The diameter of the spline teeth 20E of the second sleeve 20C on the side of the other end of the outer shaft 20 is formed smaller than the press-fit inner diameter portion 20H provided for the supporting member 41. Thereby, an annular stepped portion 20I is provided between the press-fit inner diameter portion 20H and the spline teeth 20E. A stop ring 42 is fitted into the annular groove 22D provided in a lateral side portion on the outer end side for the spline teeth 22C of the other end 22B of the second inner shaft 22, and is brought into engagement with the annular stepped portion 20I. At this time, the end face of the pressing portion 41B of the supporting member 41 contacts with side face of the stop ring 42 and press-holds the stop ring 42 to the annular stepped portion 20I. Consequently, the outer shaft 20 and the second inner shaft 22 are integrally assembled together to avoid axial vibration, and the projection position or assembly position of the second inner shaft 22 is determined with respect to the outer shaft 20. In the assembled state, an end face 41C of the supporting portion 41A of supporting member 41 (a stepped face between a supporting portion 41A and the pressing portion 41B), may be free-fitted via a spacing between the end face of the second inner shaft 22. Alternatively, the aforementioned faces may be in contact with the end face of the first inner shaft 22.

The second shock absorbing section 40 is assembled according to steps as described hereunder.

(1) Light press-fit is performed for the spline teeth 20E provided in the second sleeve 20C of the outer shaft 20 and for the spline teeth 22C provided in other end 22B of the second inner shaft 22. The outer shaft 20 and the second inner shaft 22 are axially slid or retracted until the annular groove 22D of the second inner shaft 22 projects outwardly, and the stop ring 42 is fitted into the annular groove 22D.

(2) The outer shaft 20 and the second inner shaft 22 are axially slid or extended until the stop ring 42 fitted into the second inner shaft 22 contacts and engages the annular stepped portion 20I of the second sleeve 20C of the outer shaft 20. Thereby, the projection position or assembly position of the second inner shaft 22 is determined with respect to the outer shaft 20.

(3) The supporting member 41 is press-fit into the press-fit inner diameter portion 20H of the second sleeve 20C of the outer shaft 20. In this case, while the structure is being secured such that the stop ring 42 is engaged with the annular stepped portion 20I of the second sleeve 20C, the end face of the pressing portion 41B of the supporting member 41 is brought into contact with the stop ring 42 fitted into the annular groove 22D of the second inner shaft 22. Steps (2) and (3) may be performed concurrently with the press-fit of the supporting member 41 in appropriate combinations.

(4) The other end of the steel pipe 20A is welded to the second sleeve 20C of the outer shaft 20.

Operation of the propeller shaft assembly 10 will be described hereinbelow.

Impact loads may be exerted on the engine from a front portion of the vehicle after deformed crushable zones such as an engine room of the vehicle have exhausted their ability to absorb energy. In this case, the impact loads are then absorbed and relaxed sequentially in the transmission, front shaft 11 of the propeller shaft assembly 10, the first shock absorbing section 30 of the front shaft 11, and the second shock absorbing section 40 of the front shaft 11.

More specifically, in the first shock absorbing section 30, the impact loads lead to spline disengagement between the spline teeth 20D of the first sleeve 20B of the outer shaft 20 and the spline teeth 21C of the other end 21B of the first inner shaft 21. Further, the impact loads cause disengagement of the supporting member 31 press-fit into the press-fit inner diameter portion 20F of the first sleeve 20B of the outer shaft 20. This causes the other end 21B of the first inner shaft 21 to slide into the steel pipe 20A of the outer shaft 20, whereby the outer shaft 20 and the first inner shaft 21 are retracted relative to each other. The impact loads are absorbed and relaxed by energy causing the supporting member 31 to be disengaged from the press-fit inner diameter portion 20F of the first sleeve 20B and relative displacement therebetween. The movement of the first inner shaft 21 stops upon contact of a stopper portion 21E or flange, shown in FIG. 11 on the side of the one end 21A of the first inner shaft 21 with the end face of the first sleeve 20B of the outer shaft 20.

In the case that full impact loads cannot be absorbed in the first shock absorbing section 30, the stopper portion 21E on the side of the one end 21A of the first inner shaft 21 is contacted with the end face of the first sleeve 20B of the outer shaft 20. Thereby, the impact loads are exerted on the side of the second shock absorbing section 40 via the outer shaft 20 and are further absorbed in the second shock absorbing section 40 as in the first shock absorbing section 30. That is, the impact loads cause a release of the spline engagement between the spline teeth 20E of the second sleeve 20C of the outer shaft 20 and the spline teeth 22C of the other end 22B of the second inner shaft 22. Further, the impact loads cause disengagement of a supporting member 41 press-fit into a press-fit inner diameter portion 20H of the second sleeve 20C of the outer shaft 20. Thereby, the loads permit the other end 22B of the second inner shaft 22 to slide into the steel pipe 20A of the outer shaft 20 and consequently cause the outer shaft 20 and the second inner shaft 22 to be retracted relative to each other. In this case, the steel pipe 20A of the outer shaft 20 and the second sleeve 20C move by breaking through the rubbery resilient member 18A of the center bracket 19. As such, the impact loads are effectively absorbed and relaxed by energy that acts to disengage the supporting member 41 from the press-fit inner diameter portion 20H of the second sleeve 20C and relative displacement therebetween. The movement of the outer shaft 20 stops upon contact the end face of the second sleeve 20C of the outer shaft 20 with a stopper portion 22E, shown in FIG. 11, on the side of the one end 22A of the second inner shaft 22.

In each of the shock absorbing sections 30 and 40, the press-fit strength for each of the supporting members 31 and 41 is set to a level that does not allow a fatal shock to be transmitted to passengers in the vehicle cabin at the time of input of impact loads.

(1) The shock absorbing sections 30 and 40 are constructed such that the supporting members 31 and 41 are press-fit into the inner-diameter portions of the outer shaft 20. Accordingly, processing and assembly are easy, and costs can be reduced.

(2) The supporting members 31 and 41 to be press-fit into the outer shaft 20 are members independent of the inner shafts 21 and 22. Accordingly, the influence of vibration in the rotational direction of the spline engagements between the outer shaft 20 and the inner shafts 21 and 22 does not extend to the press-fit portions of the supporting members 31 and 41. Consequently, the press-fit strength of the supporting members 31 and 41 into the outer shaft 20 can be set with high accuracy for impact loads, and reliable durability.

(3) The end faces of inner shafts 21 and 22 are brought into contact with the supporting members 31 and 41 in the retraction direction with respect to the outer shaft 20. In addition, the stop rings 32 and 42 fitted to the end portions of the inner shafts 21 and 22 are brought into engagement with the stepped portions 20G and 20I between the press-fit inner diameter portions 20F and 20H and the spline teeth 20D and 20E of the supporting members 31 and 41 of the outer shaft 20. Accordingly, the inner shafts 21 and 22 can be prevented from becoming disengaged from the outer shaft 20. Concurrently, the projection positions of the inner shafts 21 and 22 with respect to the outer shaft 20 can be determined. Further, the distance of the movements or shock absorption strokes of the inner shafts 21 and 22 can be determined.

(4) The grooves 21D and 22D are provided to fit the stop rings 32 and 42 to the end portions of the inner shafts 21 and 22. In addition, the pressing portions 31B and 41B of the supporting members 31 and 41 are used to press-hold the stop rings 32 and 42 to the annular stepped portions 20G and 20I described in (3) above. Accordingly, press-fitting loads exerted on the supporting members 31 and 41 are carried by the annular stepped portions 20G and 20I described in (3) above from the pressing portions 31B and 41B via the stop rings 32 and 42. As such, the likelihood is reduced of an occurrence such that, for example, the annular grooves 21D and 22D for the stop rings 32 and 42 provided in the end portions of the inner shafts 21 and 22 are broken down closed or damaged. Consequently, the stop rings 32 and 42 can be reliably provided.

(5) The plurality of shock absorbing sections, namely the shock absorbing sections 30 and 40, are axially disposed in alignment. Accordingly, impact loads can be sequentially absorbed by the shock absorbing sections 30 and 40. Consequently, the shock absorbing performance of the propeller shaft assembly 10 can be improved.

Fourth Embodiment

Figure 17:
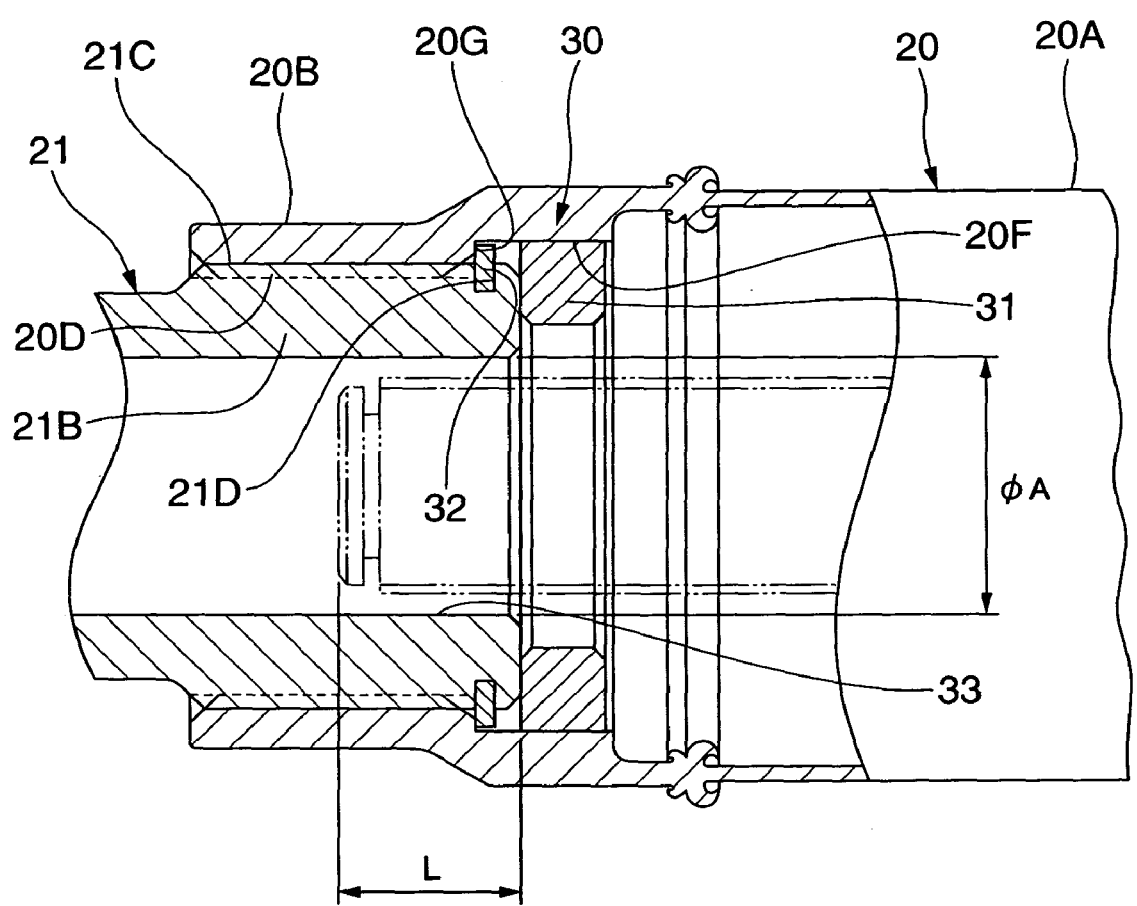
FIG. 17 is a cross-sectional view of a first shock absorbing section.

First Shock Absorbing Section 30. FIG. 17.

In the first shock absorbing section 30, an outer periphery portion of the supporting member 31 formed of an annular collar is press-fit into a press-fit inner diameter portion 20F provided to the first sleeve 20B on the side of the one end of the outer shaft 20. In addition, the end face of the first inner shaft 21 is brought into contact with an end face of the supporting member 31 in a retraction direction with respect to the outer shaft 20, (a direction along which the first inner shaft 21 slides into the hollow portion of the outer shaft 20, or a rightward direction as viewed in FIG. 17.

The diameter of the spline teeth 20D of the first sleeve 20B on the side of the one end of the outer shaft 20 is formed smaller than the press-fit inner diameter portion 20F provided for the supporting member 31. Thereby, an annular stepped portion 20G is provided between the press-fit inner diameter portion 20F and the spline teeth 20D. A stop ring 32 is fitted into the annular groove 21D provided in a lateral side portion on the outer end side for the spline teeth 21C of the other end 21B of the first inner shaft 21, and is brought into engagement with the annular stepped portion 20G. In this case, the supporting member 31 is press-fit into contact with the end face of the first inner shaft 21 in the direction of extension with respect to the outer shaft 20. The supporting member 31 presses the stop ring 32, which is fitted into the annular groove 21D of the first inner shaft 21, to the stepped portion 20G and supports the stop ring 32. Consequently, the outer shaft 20 and the first inner shaft 21 are integrally assembled together to avoid axial vibration, and the projection position or assembly position of the first inner shaft 21 is determined with respect to the outer shaft 20.

The first shock absorbing section 30 is assembled according to steps as described hereunder.

(1) Light press-fit is performed for the spline teeth 20D provided in the first sleeve 20B of the outer shaft 20 and for the spline teeth 21C provided in other end 21B of the first inner shaft 21. The outer shaft 20 and the first inner shaft 21 are axially slid or (retracted) until the annular groove 21D of the first inner shaft 21 projects outwardly, and the stop ring 32 is fitted into the annular groove 21D.

(2) The outer shaft 20 and the first inner shaft 21 are axially slid or extended until the stop ring 32 fitted into the first inner shaft 21 contacts and engages the annular stepped portion 20G of the first sleeve 20B of the outer shaft 20. Thereby, the projection position or assembly position of the first inner shaft 21 is determined with respect to the outer shaft 20.

(3) The supporting member 31 is press-fit into the press-fit inner diameter portion 20F of the first sleeve 20B of the outer shaft 20. In this case, while the structure is being secured such that the stop ring 32 is engaged with the annular stepped portion 20G of the first sleeve 20B, the end face of the first inner shaft 21 is brought into contact with the end face of the supporting member 31.

(4) The one end of the steel pipe 20A is welded to the first sleeve 20B of the outer shaft 20.

Figure 18:
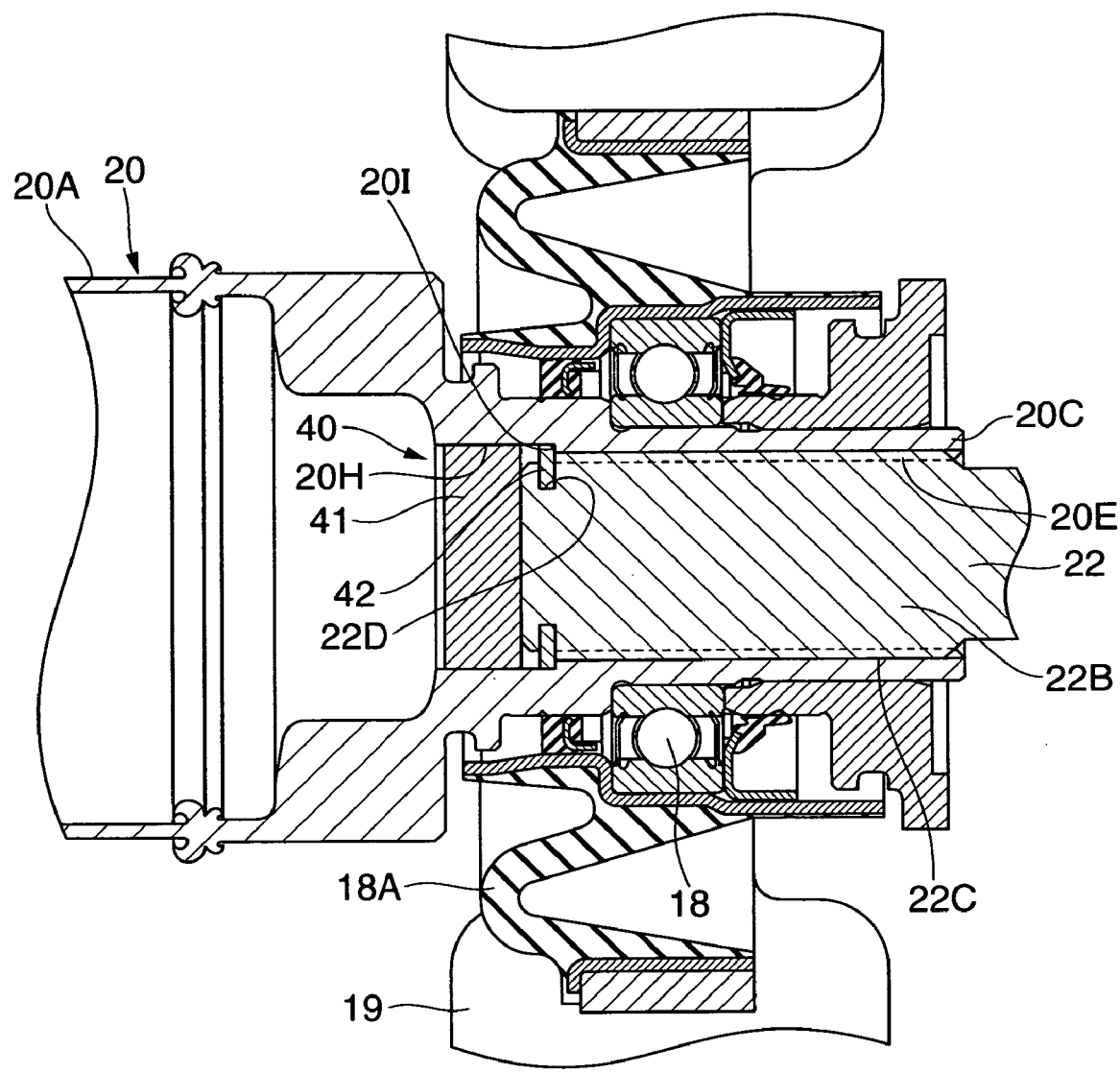
FIG. 18 is a cross-sectional view of a second shock absorbing section.

Second Shock Absorbing Section 40. FIG. 18.

In the second shock absorbing section 40, an outer periphery portion of the supporting member 41 formed of an annular collar is press-fit into a press-fit inner diameter portion 20H provided to the second sleeve 20C on the side of the other end of the outer shaft 20. In addition, the end face of the second inner shaft 22 is brought into contact with an end face of the supporting member 41 in a retraction direction with respect to the outer shaft 20, (a direction along which the second inner shaft 22 slides into the hollow portion of the outer shaft 20, or a leftward direction as viewed in FIG. 18).

The diameter of the spline teeth 20E of the second sleeve 20C on the side of the other end of the outer shaft 20 is formed smaller than the press-fit inner diameter portion 20H provided for the supporting member 41. Thereby, an annular stepped portion 20I is provided between the press-fit inner diameter portion 20H and the spline teeth 20E. A stop ring 42 is fitted into the annular groove 22D provided in a lateral side portion on the outer end side for the spline teeth 22C of the other end 22B of the second inner shaft 22, and is brought into engagement with the annular stepped portion 20I. In this case, the supporting member 41 is press-fit into contact with the end face of the second inner shaft 22 in the direction of extension with respect to the outer shaft 20. The supporting member 41 presses the stop ring 42, which is fitted into the annular groove 22D of the second inner shaft 22, to the stepped portion 20I and supports the stop ring 42. Consequently, the outer shaft 20 and the second inner shaft 22 are integrally assembled together to avoid axial vibration, and the projection position or assembly position of the second inner shaft 22 is determined with respect to the outer shaft 20.

The second shock absorbing section 40 is assembled according to steps as described hereunder.

(1) Light press-fit is performed for the spline teeth 20E provided in the second sleeve 20C of the outer shaft 20 and for the spline teeth 22C provided in other end 22B of the second inner shaft 21. The outer shaft 20 and the second inner shaft 22 are axially slid or (retracted) until the annular groove 22D of the second inner shaft 22 projects outwardly, and the stop ring 42 is fitted into the annular groove 22D.

(2) The outer shaft 20 and the second inner shaft 22 are axially slid or extended until the stop ring 42 fitted into the second inner shaft 22 contacts and engages the annular stepped portion 20I of the second sleeve 20C of the outer shaft 20. Thereby, the projection position or assembly position of the second inner shaft 22 is determined with respect to the outer shaft 20.

(3) The supporting member 41 is press-fit into the press-fit inner diameter portion 20H of the second sleeve 20C of the outer shaft 20. In this case, while the structure is being secured such that the stop ring 42 is engaged with the annular stepped portion 20I of the second sleeve 20C, the end face of the second inner shaft 22 is brought into contact with the end face of the supporting member 41.

(4) The other end of the steel pipe 20A is welded to the second sleeve 20C of the outer shaft 20.

Operation of the propeller shaft assembly 10 will be described hereinbelow.

Impact loads may be exerted on the engine from a front portion of the vehicle after deformed crushable zones such as an engine room of the vehicle have exhausted their ability to absorb energy. In this case, the impact loads are then absorbed and relaxed sequentially in the transmission, front shaft 11 of the propeller shaft assembly 10, the first shock absorbing section 30 of the front shaft 11, and the second shock absorbing section 40 of the front shaft 11.

More specifically, in the first shock absorbing section 30, the impact loads lead to spline disengagement between the spline teeth 20D of the first sleeve 20B of the outer shaft 20 and the spline teeth 21C of the other end 21B of the first inner shaft 21. Further, the impact loads cause disengagement of the supporting member 31 press-fit into the press-fit inner diameter portion 20F of the first sleeve 20B of the outer shaft 20. This causes the other end 21B of the first inner shaft 21 to slide into the steel pipe 20A of the outer shaft 20, whereby the outer shaft 20 and the first inner shaft 21 are retracted relative to each other. The impact loads are absorbed and relaxed by energy causing the supporting member 31 to be disengaged from the press-fit inner diameter portion 20F of the first sleeve 20B and relative displacement therebetween. The movement of the first inner shaft 21 stops upon contact of the stopper portion 22E or flange, shown in FIG. 15, on the side of the one end 21A of the first inner shaft 21 with the end face of the first sleeve 20B of the outer shaft 20. The distance of the movement of the first inner shaft 21 corresponds to a first shock absorption stroke S1 of the first shock absorbing section 30.

In the case that full impact loads cannot be absorbed in the first shock absorbing section 30, the stopper portion 21E on the side of the one end 21A of the first inner shaft 21 is contacted with the end face of the first sleeve 20B of the outer shaft 20. Thereby, the impact loads are exerted on the side of the second shock absorbing section 40 via the outer shaft 20 and are further absorbed in the second shock absorbing section 40 as in the first shock absorbing section 30. That is, the impact loads cause a release of the spline engagement between the spline teeth 20E of the second sleeve 20C of the outer shaft 20 and the spline teeth 22C of the other end 22B of the second inner shaft 22. Further, the impact loads cause disengagement of a supporting member 41 press-fit into a press-fit inner diameter portion 20H of the second sleeve 20C of the outer shaft 20. Thereby, the loads permit the other end 22B of the second inner shaft 22 to slide into the steel pipe 20A of the outer shaft 20 and consequently cause the outer shaft 20 and the second inner shaft 22 to be retracted relative to each other. In this case, the steel pipe 20A of the outer shaft 20 and the second sleeve 20C moves by breaking through the rubbery resilient member 18A of the center bracket 19. As such, the impact loads are effectively absorbed and relaxed by energy that acts to disengage the supporting member 41 from the press-fit inner diameter portion 20H of the second sleeve 20C and relative displacement therebetween. The movement of the outer shaft 20 stops upon contact of the end face of the second sleeve 20C if the outer shaft 20 with the stopper portion 22E or flange, shown in FIG. 15, on the side of the one end 22A of the second inner shaft 22. The movement distance of the outer shaft 20 corresponds to a shock absorption stroke S2 of the second shock absorbing section 40.

Figure 16:
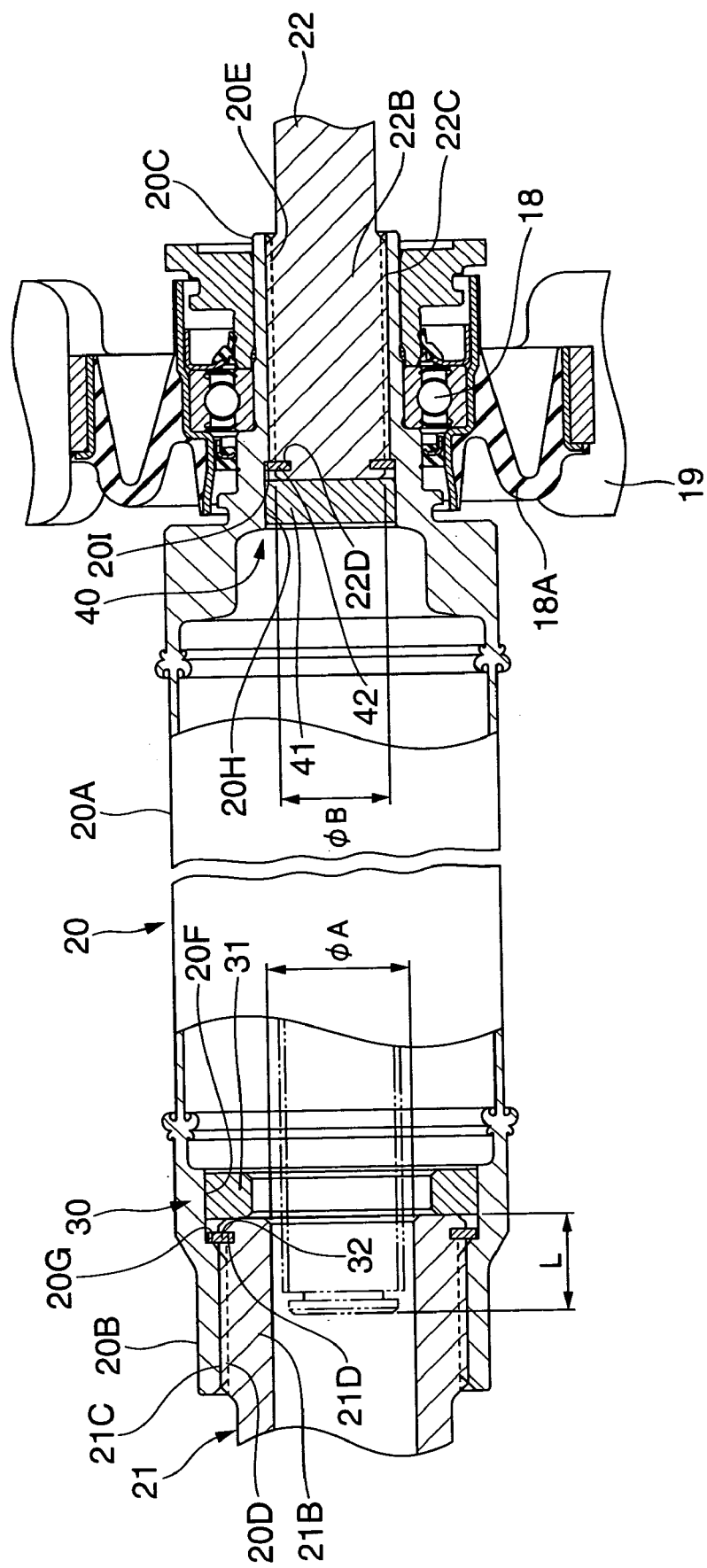
FIG. 16 is an enlarged partially exploded view of major portions of the propeller shaft assembly shown in FIG. 15.

Accordingly, in the propeller shaft assembly 10, a free-fit preparation portion 33 is preliminarily provided in the first inner shaft 21. At the time of retraction of the outer shaft 20 and the second inner shaft 22 of the second shock absorbing section 40 between the mutually adjacent shock absorbing sections 30 and 40, the first shock absorbing section 30 enables the second inner shaft 22 of the second shock absorbing section 40 to be free-fitted so that the second inner shaft 22 laps relatively with the first inner shaft 21 of the first shock absorbing section 30. The letter "L" in FIG. 16 represents a lap length between the first inner shaft 21 and the second inner shaft 22. In one embodiment, an inner diameter A of the hollow portion of the first inner shaft 21 is set larger than an outer diameter B of the second inner shaft 22, and the hollow portion of the first inner shaft 21 is used as the free-fit preparation portion 33. In this connection, the inner diameter of the supporting member 31 is larger than the inner diameter A of the hollow portion of the first inner shaft 21 and the outer diameter B of the second inner shaft 22.

In each of the shock absorbing sections 30 and 40, the press-fit strength for each of the supporting member 31 and 41 with respect to the impact loads is set to a level that does not allow a fatal shock to be transmitted to passengers in the vehicle cabin at the time of input of impact loads.

The present embodiment exhibits operational advantages as described hereunder.

(1) In the propeller shaft assembly 10, when both the mutually adjacent first and second shock absorbing sections 30 and 40 absorb and relax impact loads, both the inner shafts 21 and 22 slide into the outer shaft 20 in series by the first and second shock absorption strokes S1 and S2. While the inner shafts 21 and 22 are both coaxially disposed, the hollow portion of the first inner shaft 21 forms the free-fit preparation portion 33 that enables the second inner shaft 22 to be freely fitted. As such, when the second shock absorbing section 40 absorbs and relaxes impact loads, the second inner shaft 22 is free-fitted to relatively lap in the axial direction without interfering with the free-fit preparation portion 33 of the first inner shaft 21. Accordingly, since the outer shaft 20 need not have an excessive length exceeding the total length of the first and second shock absorption strokes S1 and S2, the overall length of the propeller shaft assembly 10 need not be increased. Consequently, the weight of the propeller shaft assembly 10 can be reduced.

(2) With the hollow portion of the first inner shaft 21, the free-fit preparation portion 33 can easily be formed, so that dead space in the hollow portion of the inner shaft can be effectively utilized as the lap length.

An example is that, according to the invention, each shock absorbing section is constructed such that the supporting member is press-fit into the inner-diameter portion of the outer shaft, and the end face of the inner shaft is disposed in contact with the supporting member in the retraction direction with respect to the outer shaft. However, the each shock absorbing section of the invention may be such that the supporting member is press-fitted press-fit into the inner-diameter portion of the outer shaft in any manner. Alternatively, the shock absorbing section may be such that no press-fit supporting member is used.

According to the invention, in the propeller shaft assembly, the each shock absorbing section can easily be constructed with high accuracy, whereby the shock absorbing performance can be stabilized.

Further, according to the invention, in the propeller shaft assembly in which the plurality of shock absorbing sections are axially disposed, predetermined shock absorption stroke lengths can easily be achieved without increasing the overall length of the propeller shaft assembly.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A propeller shaft assembly, comprising: at least one shock absorbing section, said shock absorbing section comprising an outer shaft, an inner shaft and a supporting member, said outer shaft having splined portion with a plurality of axially extending spline teeth in an inner peripheral surface of the outer shaft and said inner shaft having a splined portion with a plurality of axially extending spline teeth in an outer peripheral surface of the inner shaft, said splined portion of the outer shaft and said splined portion of the inner shaft are mutually spline-engaged such that the inner shaft and the outer shaft are retractable with impact loads, the supporting member is an annular collar, and a stop ring fitted to the end face of the inner shaft is engaged with a stepped portion, wherein the shock absorbing section is arranged and constructed such that the supporting member is press-fit into an inner diameter portion of the outer shaft, and an end face of the inner shaft is disposed in contact with the supporting member in a direction of retraction with respect to the outer shaft, wherein the supporting member structure is arranged and constructed to facilitate adjustment of the press fit strength and related displaceability of the supporting member.

2. A propeller shaft assembly according to claim 1, wherein: in the outer shaft, the splined portion is smaller in diameter than a press-fit inner diameter portion provided for the supporting member, and the stepped portion is provided between the press-fit inner diameter portion and the splined portion of the outer shaft.

3. A propeller shaft assembly according to claim 1, wherein a plurality of the shock absorbing sections are axially disposed in alignment.

4. A propeller shaft assembly according to claim 2, wherein a plurality of the shock absorbing sections are axially disposed in alignment.

* * * * *